United States Patent [19]

Shimizu

[11] Patent Number: 5,417,058
[45] Date of Patent: May 23, 1995

[54] DEVICE FOR DETECTING DETERIORATION OF A CATALYTIC CONVERTER FOR AN ENGINE

[75] Inventor: Yasuhiro Shimizu, Nishikamo, Japan

[73] Assignee: Toyota Jidosha Kabushiki Kaisha, Toyota, Japan

[21] Appl. No.: 123,162

[22] Filed: Sep. 20, 1993

[30] Foreign Application Priority Data

Sep. 30, 1992 [JP] Japan .................. 4-261840
Oct. 1, 1992 [JP] Japan .................. 4-263746

[51] Int. Cl.⁶ .............................. F01N 3/20
[52] U.S. Cl. ........................ 60/276; 60/277; 60/285; 60/323; 123/703
[58] Field of Search ........... 60/273, 274, 276, 277, 60/285, 323; 123/672, 703

[56] References Cited

U.S. PATENT DOCUMENTS

| 3,939,654 | 2/1976 | Creps | 60/276 |
| 4,027,477 | 6/1977 | Storey | 60/276 |
| 4,739,614 | 4/1988 | Katsuno et al. | 60/276 |
| 5,074,113 | 12/1991 | Matsuoka | 60/276 |
| 5,207,057 | 5/1993 | Kayanuma | 60/285 |

FOREIGN PATENT DOCUMENTS

| 49-109721 | 10/1974 | Japan . |
| 63-79448 | 5/1985 | Japan . |
| 60-231155 | 11/1985 | Japan . |
| 61-185634 | 8/1986 | Japan . |
| 62-29711 | 2/1987 | Japan . |
| 63-97852 | 4/1988 | Japan . |
| 63-147941 | 6/1988 | Japan . |
| 63-115556 | 7/1988 | Japan . |
| 1-8332 | 1/1989 | Japan . |
| 1-110852 | 4/1989 | Japan . |
| 1-134046 | 5/1989 | Japan . |
| 2-30915 | 2/1990 | Japan . |
| 2-33408 | 2/1990 | Japan . |
| 2-91440 | 3/1990 | Japan . |
| 2-207159 | 8/1990 | Japan . |
| 3-26845 | 2/1991 | Japan . |
| 3-57862 | 3/1991 | Japan . |
| 3-134241 | 6/1991 | Japan . |
| 3-199643 | 8/1991 | Japan . |
| 3-286160 | 12/1991 | Japan . |

Primary Examiner—Ira S. Lazarus
Assistant Examiner—Daniel J. O'Connor
Attorney, Agent, or Firm—Oliff & Berridge

[57] ABSTRACT

A device for detecting the deterioration of a catalytic converter for an engine having two or more cylinder groups, and a catalytic converter disposed in a common exhaust passage with which exhaust passages individually connected to the respective cylinder groups are merged, wherein the air-fuel ratio of the respective cylinder groups are controlled independently based on the output of the upstream air-fuel ratio sensors disposed in the respective individual exhaust passages. Since the air-fuel ratios of the respective cylinder groups are controlled independently, the phases of the air-fuel ratio oscillations of exhaust gases flowing into the common exhaust passage from the individual exhaust passages are usually not synchronized. However, during the engine operation, the phases of the air-fuel ratio oscillations of the exhaust gases are occasionally spontaneously synchronized due to slight differences of the periods of the cycle of the air-fuel ratio feedback controls in the respective cylinder groups. The device detects such a spontaneous synchronization, and determines whether or not the catalytic converter has deteriorated based on the output of the downstream air-fuel ratio sensor disposed in the common exhaust passage downstream of the catalytic converter.

11 Claims, 27 Drawing Sheets

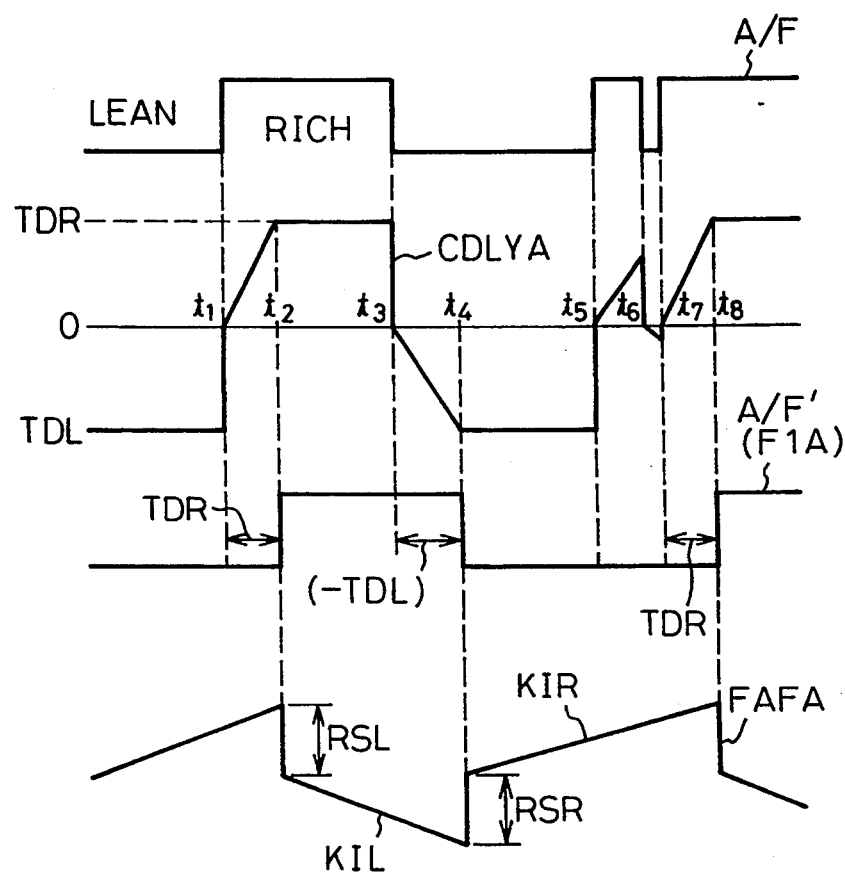

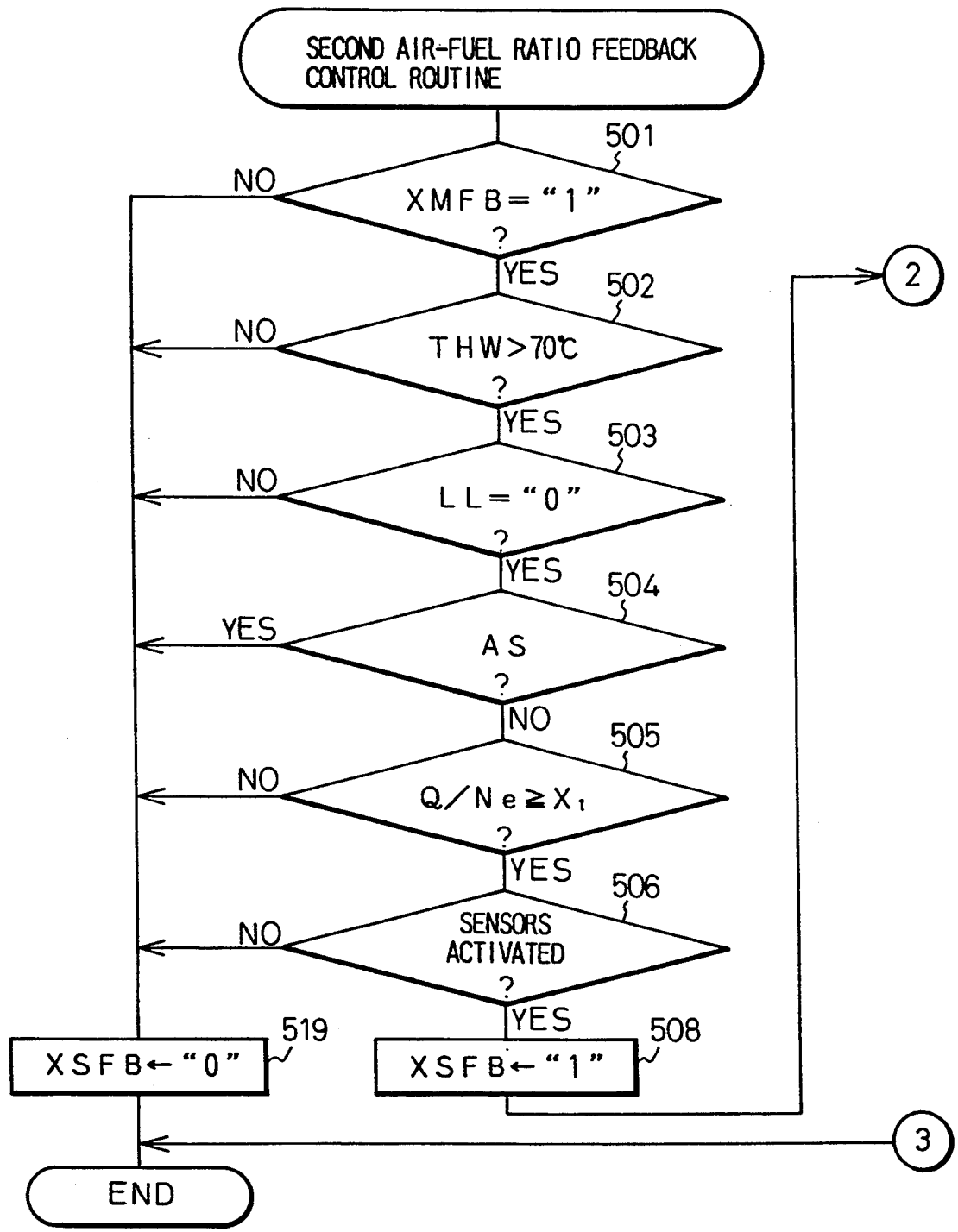

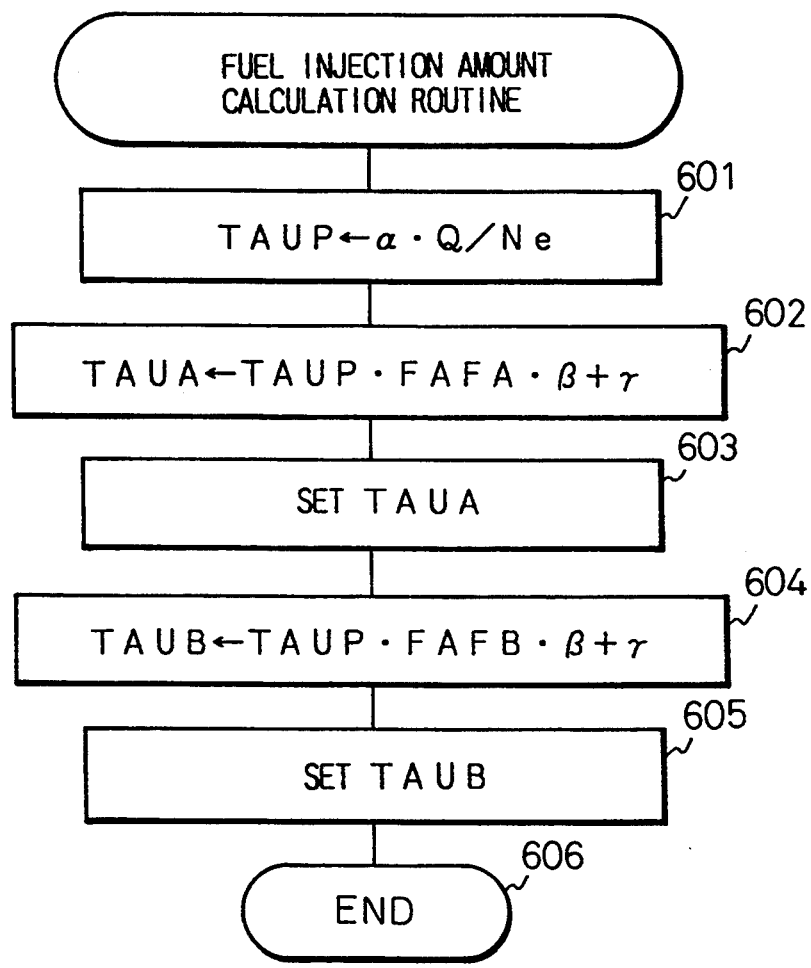

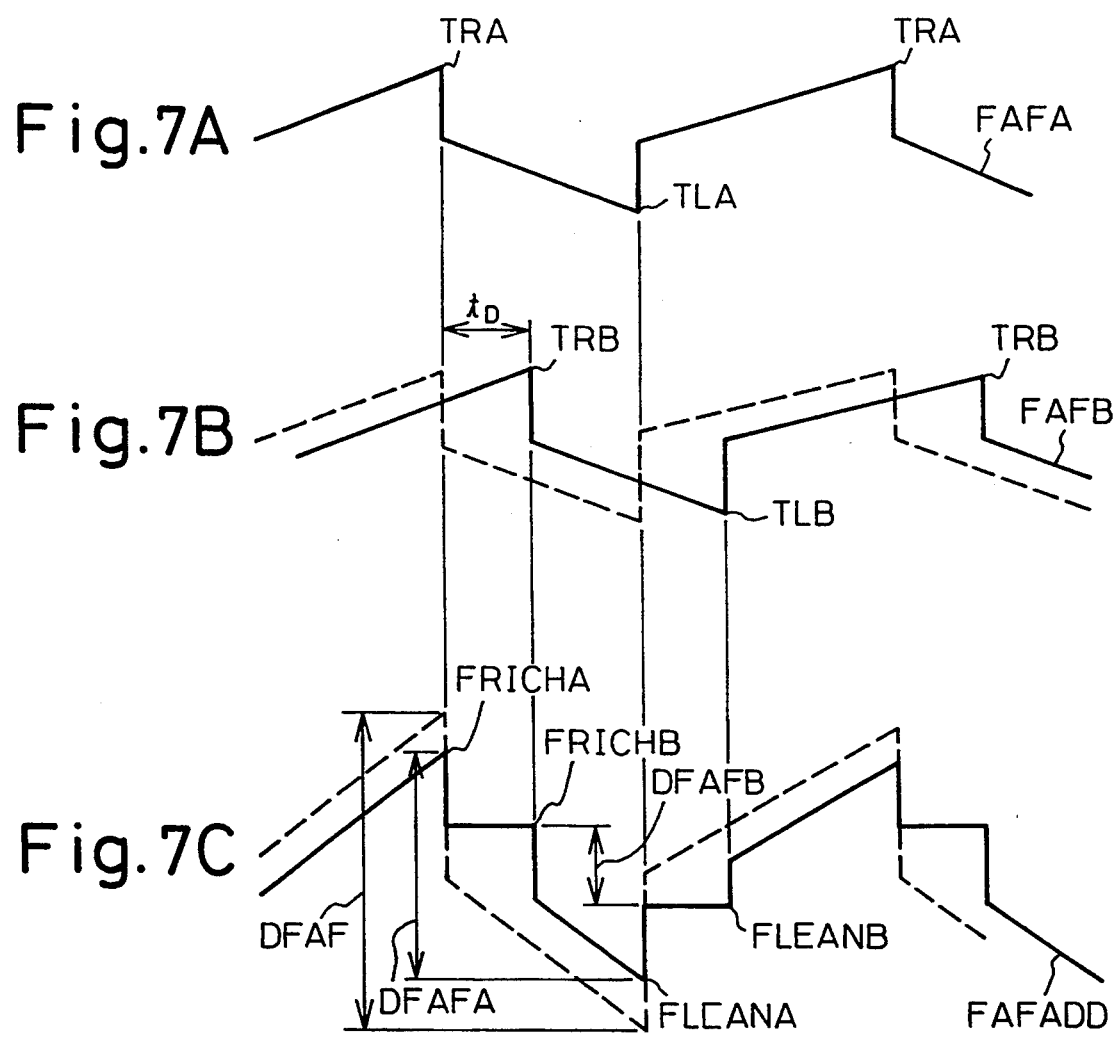

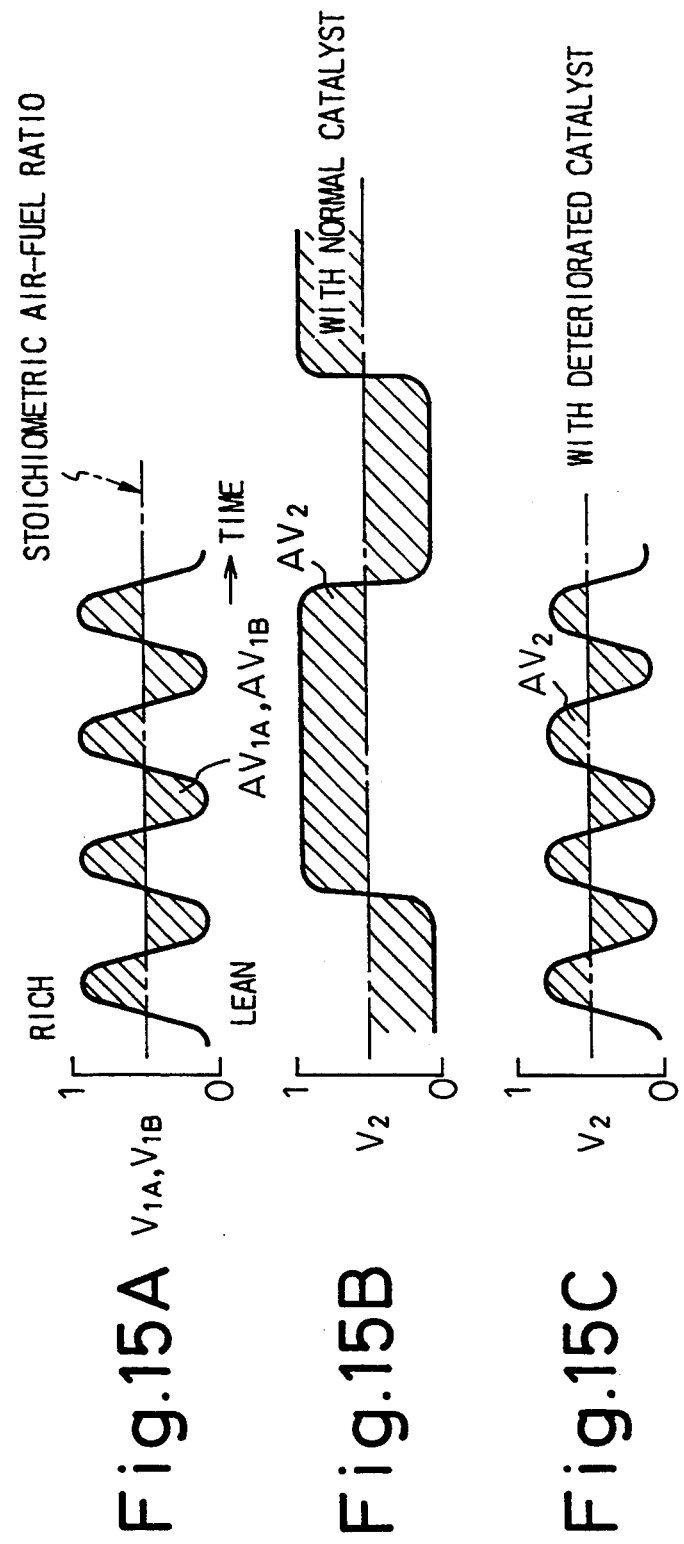

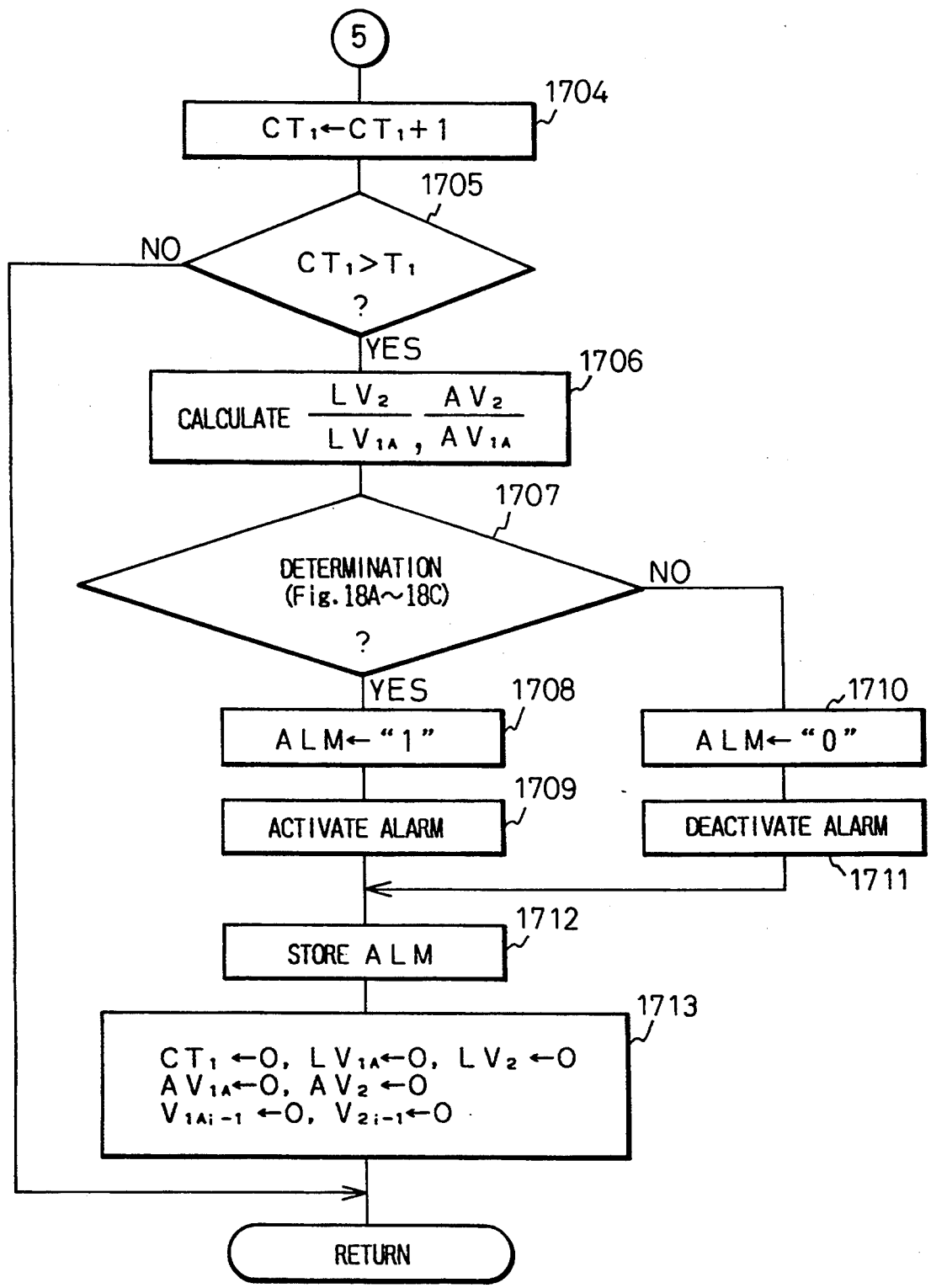

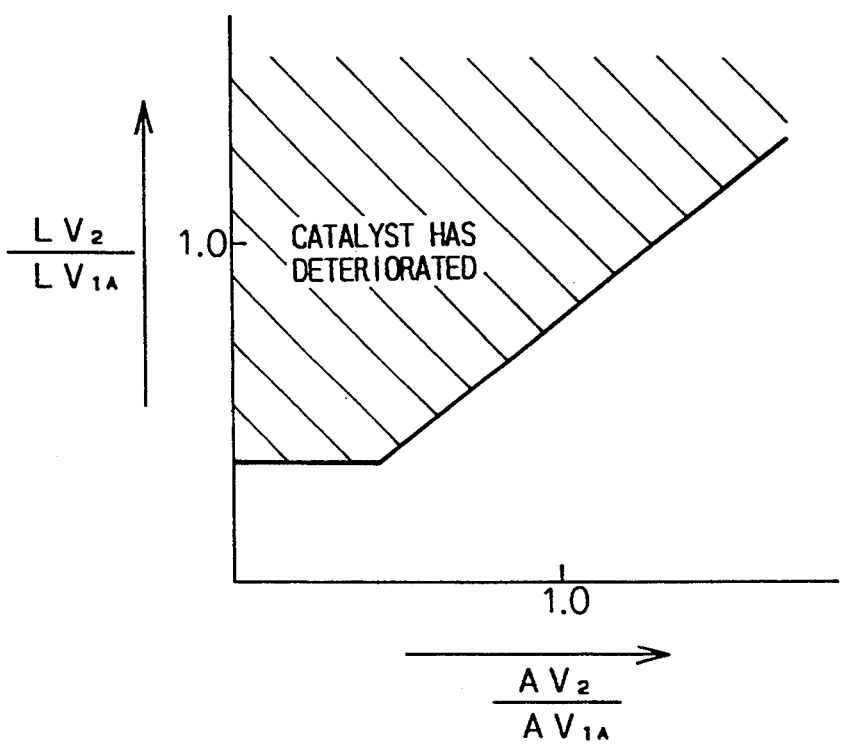

DEVICE FOR DETECTING DETERIORATION OF A CATALYTIC CONVERTER FOR AN ENGINE

BACKGROUND OF THE INVENTION

1. Field of the Invention

The present invention relates to a device for detecting the deterioration of a catalytic converter on an internal combustion engine, and more particularly, relates to a device which is capable of detecting the deterioration of a catalytic converter disposed in a common exhaust passage of an engine having cylinders divided into multiple-cylinder groups such as a V-type or horizontally-opposed engine.

2. Description of the Related Art

An air-fuel ratio control device for controlling the air-fuel ratio of an engine by feedback control based on an output of one air-fuel ratio sensor ($O_2$ sensor) disposed in an exhaust passage upstream of a catalytic converter is known as a single $O_2$ sensor system. The single $O_2$ sensor system is used to control the air-fuel ratio of the engine at a stoichiometric air-fuel ratio and to reduce polluting exhaust emissions by utilizing the capacity of the three-way catalytic converter to the maximum.

Also, to compensate for individual differences in the output characteristics of the $O_2$ sensors, or changes thereof due to aging, a double $O_2$ sensor system using two $O_2$ sensors has been developed (U.S. Pat. No. 4,739,614). In the double $O_2$ sensor system, $O_2$ sensors are disposed upstream and downstream of the catalytic converter in the exhaust passage, and the air-fuel ratio control is carried out based on the output of the downstream $O_2$ sensor as well as the output of the upstream $O_2$ sensor. According to the double $O_2$ sensor system, since fluctuations in the output of the upstream $O_2$ sensor are compensated for by a feedback control using the output of the downstream $O_2$ sensor, good emission control characteristics are maintained even when the output characteristics of the upstream $O_2$ sensor deteriorate.

Nevertheless, even in the double $O_2$ sensor system, if the catalyst in the catalytic converter deteriorates, the ability of the catalyst to remove pollutants in the exhaust gas such as HC, CO, $NO_x$ falls. Therefore, it is necessary to detect the deterioration of the catalyst in the catalytic converter accurately.

To detect the deterioration of the catalyst in the catalytic converter, various methods and devices have been proposed.

For example, the deterioration of the catalyst in the catalytic converter can be determined by detecting a deterioration in the $O_2$ storage capacity of the catalyst. That is, the catalyst has an ability to adsorb oxygen from the exhaust gas when the air-fuel ratio is rich compared to the stoichiometric air-fuel ratio (i.e., the air-fuel ratio of the exhaust gas is lower than the stoichiometric air-fuel ratio), and to release said oxygen when the air-fuel ratio is lean compared to the stoichiometric air-fuel ratio (i.e., the air-fuel ratio of the exhaust gas is higher than the stoichiometric air-fuel ratio). This capacity, i.e., the $O_2$ storage capacity of the catalyst, falls as the deterioration of the catalyst proceeds. Therefore, when the catalyst is in normal condition, the fluctuation of the air-fuel ratio of the exhaust gas downstream of the catalytic converter is small, and consequently, the fluctuation of the output of the downstream $O_2$ sensor also becomes small even if the air-fuel ratio of the exhaust gas is oscillates between a rich air-fuel ratio and a lean air-fuel ratio. On the contrary, if the catalyst has deteriorated, the air-fuel ratio of the exhaust gas downstream of the catalytic converter oscillates in a similar manner as the oscillation of the air-fuel ratio of the exhaust gas upstream of the catalytic converter due to the deterioration of the $O_2$ storage capacity of the catalyst, and the output of the downstream $O_2$ sensor also fluctuates as the output of the upstream $O_2$ sensor fluctuates. Therefore, when the catalyst has deteriorated, the interval between reversals of the output signal of the downstream $O_2$ sensor (i.e., the period between changes of the output signal of the downstream $O_2$ sensor from a rich air-fuel ratio signal to a lean air-fuel ratio signal, or vice versa ) during air-fuel ratio feedback control becomes shorter (in other words, the number of the reversals of the output signal of the downstream $O_2$ sensor within a predetermined time becomes larger), and the amplitude of the fluctuations in the output signal of the downstream $O_2$ sensor becomes larger at the same time.

In the system disclosed in U.S. Pat. No. 4,739,614, it is determined that the catalyst has deteriorated when the ratio of the intervals between the reversals of the upstream $O_2$ sensor $T_1$ to the intervals between the reversals of the downstream $O_2$ sensor $T_2$, i.e., $T_1/T_2$ becomes larger than a predetermined value (or, alternatively, when the interval $T_2$ of the of the downstream $O_2$ sensor becomes smaller than a predetermined value).

The double $O_2$ sensor system is also applied to engines, such as V-type or horizontally-opposed engines, in which the cylinders of the engine are divided into two or more cylinder groups. In this case, individual exhaust passages from the respective cylinder groups are merged into one common exhaust passage, and a catalytic converter is disposed in the common exhaust passage. The upstream $O_2$ sensors, one for each cylinder group, are disposed in the respective individual exhaust passages, and single downstream $O_2$ sensor is disposed in the common exhaust passage down stream of the catalytic converter.

An example of this type of multiple $O_2$ sensor system (which is called a "triple $O_2$ sensor system") is disclosed in Japanese Unexamined Patent Publication (KOKAI) No. 1-8332. In this system, the air-fuel ratios of the respective cylinder groups are controlled independently from other cylinder groups based on the output of corresponding upstream $O_2$ sensor. However, the air-fuel ratio controls of the respective cylinder groups are corrected based on the output of the single downstream $O_2$ sensor.

However, in the triple $O_2$ sensor system, it is difficult to detect the deterioration of the catalytic converter based on the output of the downstream $O_2$ sensor. In the triple $O_2$ sensor system, since the air-fuel ratios of the respective cylinder groups are controlled independently, based on the output of the corresponding upstream $O_2$ sensors, the air-fuel ratios of the respective cylinder groups do not change in a synchronous manner. In other word, the phases of the changes in the air-fuel ratios of the exhaust gases from the respective cylinder groups are different. These exhaust gases having different air-fuel ratio phase changes, flow into the common exhaust passage and are mixed with each other before flowing into the catalytic converter. Consequently, the rate of change of the air-fuel ratio (on the frequency or the interval of reversals) of the exhaust gas flowing into the catalytic converter does not coincide with the rate of change of the air-fuel ratio of any of the cylinder groups. Also, these changes in the exhaust gas flowing into the converter varies widely as the difference in the phases of the air-fuel ratios of the respective cylinder groups varies. Therefore, in the triple $O_2$ sensor system, the output of the downstream $O_2$ sensor also varies widely even if the degree of deterioration of the catalytic converter is the same. This makes it difficult to detect the deterioration of the catalytic converter based on the output of the downstream $O_2$ sensor in the triple $O_2$ sensor system.

To solve the above-mentioned problem, U.S. Pat. No. 5,207,057, proposes a device for detecting the deterioration of a catalytic converter used in the triple $O_2$ sensor system, in which the individual air-fuel ratio control of the respective cylinder groups based on the respective upstream $O_2$ sensors is stopped when the detection of the deterioration of the catalytic converter is carried out. That is, when the detection of the deterioration of the catalytic converter is to be carried out, the device controls the air-fuel ratios of all the cylinder groups based on one of the upstream $O_2$ sensors, so that the air-fuel ratios of all the cylinder groups change synchronously. Thus, the changes in the air-fuel ratio of the exhaust gas flowing into the catalytic converter after mixing also becomes synchronous with the changes in the air-fuel ratio of the exhaust gases before mixing, and deterioration of the catalytic converter can be detected effectively using the output of the downstream $O_2$ sensor.

However, in the above system, the air-fuel ratio controls of the respective cylinder groups are forced to switch from the individual control to a common control so that air-fuel ratio control of each cylinder group is synchronized to one particular cylinder group.

Therefore, when the air-fuel ratio feedback control is switched, the period of the air-fuel ratio feedback control of the cylinder groups switched becomes longer than usual during the period of switching. This may cause deterioration of the control characteristics and temporary deterioration of exhaust emissions.

SUMMARY OF THE INVENTION

In view of the above problems in the related art, the object of the invention is to provide a device for detecting the deterioration of a catalytic converter used for an engine having two or more cylinder groups, which is capable of detecting the deterioration of the catalytic converter disposed in the common exhaust passage of the engine accurately without causing deterioration of the control characteristics or exhaust emission.

According to the present invention, there is provided a device for detecting the deterioration of a three-way catalytic converter for an internal combustion engine having a plurality of cylinders divided into cylinder groups, individual exhaust passages connected to the respective cylinder groups, a common exhaust passage into which the individual exhaust passages are merged, a three-way catalytic converter disposed in said common exhaust passage, or in each of said individual exhaust passages, or both, a downstream air-fuel ratio sensor disposed in said common exhaust passage to detect an air-fuel ratio of the exhaust gas downstream of said catalytic converter(s), and an air-fuel ratio control means for individually controlling the air-fuel ratio of each cylinder group so that the air-fuel ratio of each cylinder group oscillates periodically between a rich air-fuel ratio and a lean air-fuel ratio.

The device comprises a synchronization detecting means for determining whether or not conditions in which phases of the air-fuel ratio changes in the exhaust gases flowing into the common exhaust passage from the respective individual exhaust passages spontaneously synchronize, are satisfied, and a determining means for determining whether or not said three-way catalytic converter(s) has deteriorated, based on, at least, the output signal of the downstream air-fuel ratio sensor when the synchronization detecting means determines that the conditions for the spontaneous synchronization of the phases of the air-fuel ratio changes of the exhaust gases are satisfied.

When air-fuel ratios of the respective cylinder groups are individually controlled, the lengths of the cycle of air-fuel ratio controls are slightly different in the respective cylinder groups. Accordingly, the differences among the phases of the changes in the air-fuel ratio of the exhaust gases in the respective exhaust passages change gradually during the operation of the engine. Therefore, during the operation of the engine, the changes in the air-fuel ratios of the exhaust gases flowing into the common exhaust passage synchronize occasionally at certain times.

The device according to the present invention detects the condition in which such a spontaneous synchronization occurs, and detects the deterioration of the catalytic converter when such a spontaneous synchronization occurs. Since the air-fuel ratio controls of the respective cylinder groups are not forced to be synchronized for detecting the deterioration of the catalytic converter, deterioration of the control characteristics and exhaust emissions is prevented.

BRIEF DESCRIPTION OF THE DRAWINGS

The present invention will be better understood from the description as set forth hereinafter, with reference to the accompanying drawings, in which:

FIGS. 2, 3A, 3B, 5A, 5B and 6 are flowcharts showing the air-fuel ratio feedback control operation of the control circuit in FIG. 1;

FIGS. 4A through 4D are timing diagrams explaining the flowchart of FIGS. 3A and 3B;

FIGS. 7A through 7C are timing diagrams explaining the detection of the synchronization of the phases of air-fuel ratio controls in the respective cylinder banks based on the air-fuel ratio correction factors;

FIGS. 14, 16A and 16B, 17A and 17B are flowcharts showing embodiments of the subroutine for detecting the deterioration of the catalytic converter;

FIGS. 15A through 15C schematically show the output signal response curves of the downstream $O_2$ sensor before and after the catalytic converter has deteriorated;

FIGS. 18A through 18C are the examples of the map used for detecting the deterioration of the catalytic converter in the embodiment of FIGS. 17A and 17B;

DESCRIPTION OF THE PREFERRED EMBODIMENT

Figure 1:
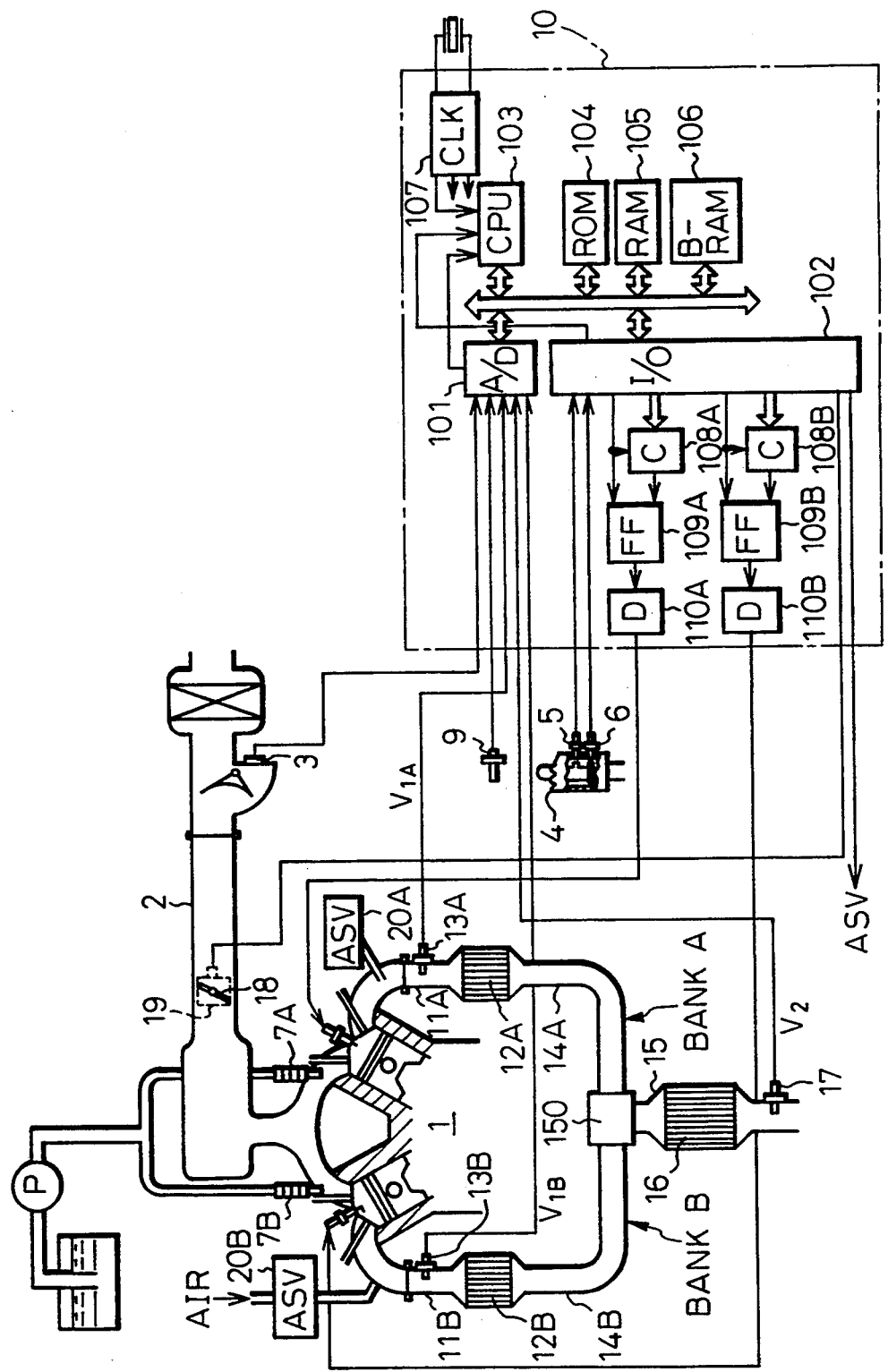
FIG. 1 is a schematic view of an internal combustion engine showing an embodiment of the present invention.

FIG. 1 schematically illustrates an embodiment of the device for detecting the deterioration of the catalytic converter according to the present invention.

In FIG. 1, reference numeral 1 represents a multiple cylinder V-type automobile engine having two groups of cylinders arranged so as to form two banks of cylinders (in FIG. 1, designated as bank A and bank B) arranged in V-shape. An air-intake passage 2 of the engine 1 is provided with a potentiometer-type air flow meter 3, for detecting an amount of air drawn into the engine 1, and which generates an analog voltage signal proportional to the amount of air flowing therethrough. The signal from the air-flow meter 3 is transmitted to a multiplexer-incorporating analog-to-digital (A/D) converter 101 of the control circuit 10. Crankangle sensors 5 and 6, for detecting the angle of the crankshaft (not shown) of the engine 1, are disposed at a distributor 4.

In this embodiment, the crankangle sensor 5 generates a pulse signal at every 720° crankangle (CA) and the crankangle sensor 6 generates a pulse signal at every 30° CA. The pulse signals from the crankangle sensors 5 and 6 are supplied to an input/output (I/O) interface 102 of the control circuit 10. Further, the pulse signal of the crankangle sensor 6 is then supplied to an interrupt terminal of a central processing unit (CPU) 103.

In the air intake passage 2, fuel injection valves 7A and 7B are provided at inlet ports of the cylinders of bank A and the bank B A coolant temperature sensor 9 for detecting the temperature of the coolant is disposed in a cylinder block of the engine 1. The coolant temperature sensor 9 generates an analog voltage signal in response to the temperature THW of the coolant, and transmits this signal to the A/D converter 101 of the control circuit 10.

In the exhaust system, the exhaust pipes 14A and 14B are connected to the exhaust manifolds 11A and 11B of the banks A and B of the cylinders, respectively, and are merged into common exhaust pipe 15 at a junction portion 150. Three-way reducing and oxidizing catalytic converters 12A and 12B (start catalytic converter) are disposed respectively in the exhaust pipes 14A and 14B downstream of the exhaust manifolds 11A and 11B.

The catalytic converters 12A and 12B are able to remove three pollutants, CO, HC and $NO_x$ from the exhaust gas, simultaneously. The converters 12A and 12B are relatively small in size, and are installed in the engine compartment of the automobile. Due to their small capacity, the catalytic converter 12A and 12B heat up rapidly, and are activated immediately after the engine 1 is started.

An upstream $O_2$ sensor 13A is provided at the exhaust manifold 11A of the bank A, i.e., upstream of the catalytic converter 12A, and an upstream $O_2$ sensor 13B is provided at the exhaust manifold 11B of the bank B, upstream of the catalytic converter 12B.

Another three-way reducing and oxidizing catalytic converter 16 (main catalytic converter) is provided in the common exhaust pipe 15. The converter 16 is relatively large in size, and is installed underneath the body of the automobile. Since the catalytic converter 16 has a large capacity, it can remove all the pollutants CO, HC, $NO_x$ which have passed through the catalytic converters 12A and 12B.

A downstream $O_2$ sensor 17 is disposed at the common exhaust pipe 15 downstream of the catalytic converter 16.

The upstream $O_2$ sensor 13A, 13B and the downstream $O_2$ sensor 17 generate output signals corresponding to the concentration of the oxygen component in the exhaust gas. More particularly, the $O_2$ sensors 13A, 13B, and 17 generate output voltage signals which are changed in accordance with whether the air-fuel ratio of the exhaust gas is rich or lean, compared with the stoichiometric air-fuel ratio. The signals output by the $O_2$ sensors 13A, 13B, and 17 are transmitted to the A/D converter 101 of the control circuit 10.

A throttle valve 18 operated by a vehicle driver, is provided in the intake air passage 2, together with an idle switch 19 for detecting the opening of the throttle valve and generating a signal ("LL signal") when the throttle valve 18 is fully closed. This LL signal is supplied to the I/O interface 102 of the control circuit 10.

References 20A, 20B designate a secondary air supply valve for introducing secondary air into the exhaust manifold 11A, 11B, to thereby reducing the emission of HC and CO during deceleration or idling of the engine.

The control circuit 10, which may be constructed of a microcomputer, further comprises a central processing unit (CPU) 103, a read-only-memory (ROM) 104 for storing a main routine and interrupt routines such as a fuel injection routine, an ignition timing routine and constants, etc., a random-access-memory (RAM) 105 for storing temporary data, a backup RAM 106, and a clock generator 107 for generating various clock signals. The backup RAM 106 is directly connected to a battery (not shown), and therefore, the contents of the backup RAM 106 are preserved even when the ignition switch (not shown) is turned off.

A down counter 108A, a flip-flop 109A, and a drive circuit 110A are provided in the control circuit 10 for controlling the fuel injection valves 7A of the cylinder bank A.

Similarly, a down counter 108B, a flip-flop 109B, and a drive circuit 110B are provided in the control circuit 10 for controlling the fuel injection valves 7B of the cylinder bank B.

Namely, when a fuel injection amount TAUA (TAUB) is calculated in a routine, as explained later, the amount TAUA (TAUB) is preset in the down counter 108A (108B), and simultaneously, the flip-flop 109A (109B) is set, and as a result, the drive circuit 110A (110B) initiates the activation of the fuel injection valve 7A (7B). On the other hand, the down counter 108A (108B) counts up the clock signal from the clock generator 107, and finally, a logic 1 signal is generated from the terminal of the down counter 108A (108B), to reset the flip-flop 109A, (109B), so that the drive circuit 110A (110B) stops the activation of the fuel injection valve 7A (7B), whereby an amount of fuel corresponding to the fuel injection amount TAUA(TAUB) is supplied to the cylinders of the bank A (bank B).

The CPU 103 is interrupted when the A/D converter 101 completes an A/D conversion and generates an interrupt signal; when the crank angle sensor 6 generates a pulse signal; and when the clock generator 107 generates a special clock signal.

The intake air amount data Q from the airflow meter 3 and the coolant temperature data THW from the coolant sensor 9 are converted by an A/D conversion routine(s) executed at predetermined intervals, and then stored in the RAM 105, i.e., the data Q and THW in the RAM 105 are updated at predetermined intervals. The engine speed Ne is calculated by an interrupt routine executed at 30° CA, i.e., at every pulse signal of the crank angle sensor 6, and is stored in the RAM 105.

The operation of the control circuit 10 of FIG. 1 will now be explained.

In this embodiment, the control circuit 10 carries out the following operations.

(1) A first air-fuel ratio feedback control based on the outputs of the upstream $O_2$ sensor 13A and 13B, for controlling the air-fuel ratio of the cylinder banks A and B separately.

(2) A second air-fuel ratio feedback control based on the outputs of the downstream $O_2$ sensor 17, for correcting the first air-fuel ratio feedback control.

(3) An operation for detecting the deterioration of catalytic converter based on the output of the downstream $O_2$ sensor 17.

Hereinafter, these operations are explained in detail with reference to the attached drawings.

(1) A first air-fuel ratio feedback control

As explained above, in the first air-fuel ratio feedback control, the air-fuel ratios of the cylinder banks A and B are controlled separately, based on the respective output signals of the upstream $O_2$ sensors 13A and 13B.

Figure 2:
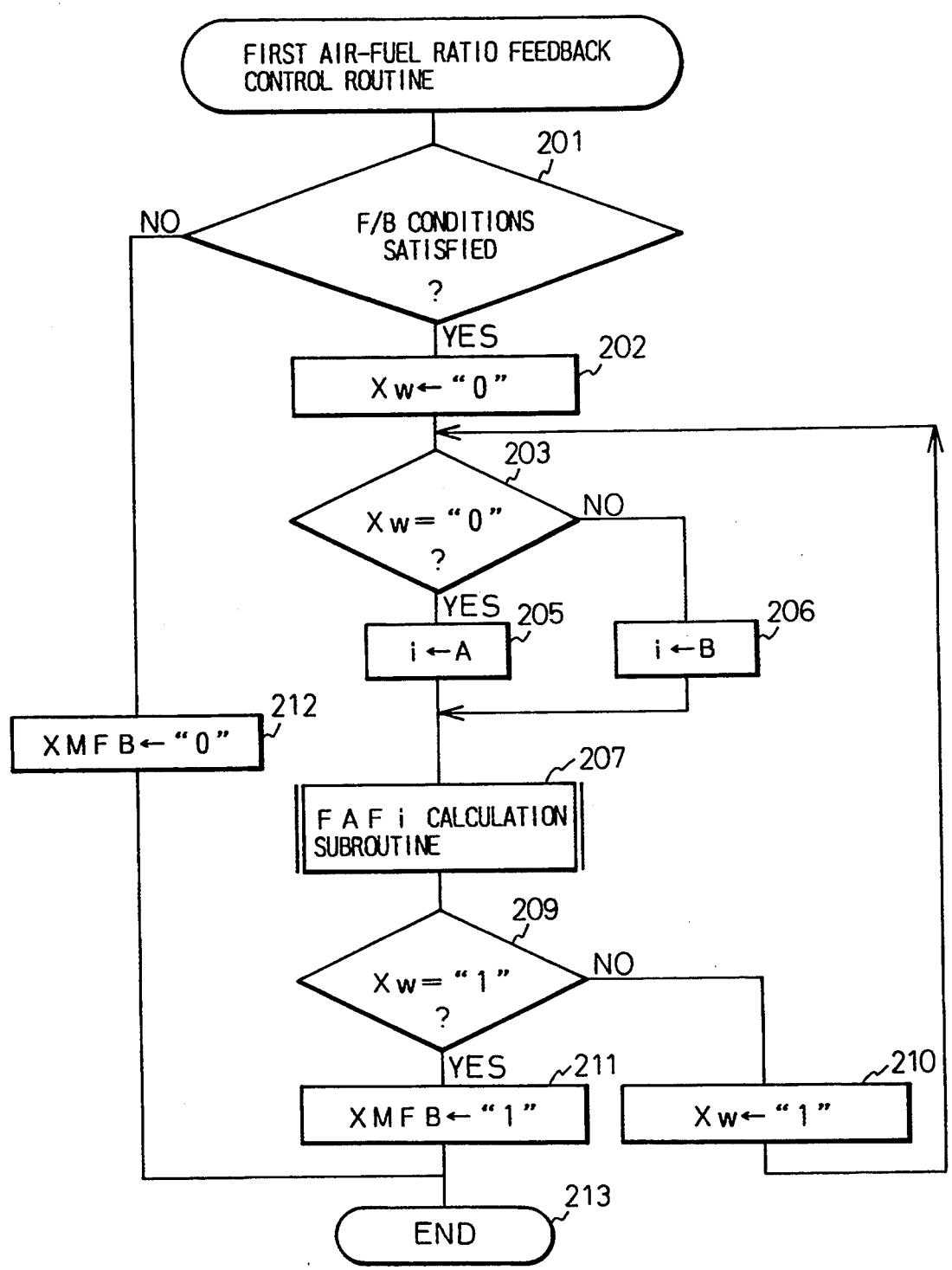
Figure 3A:
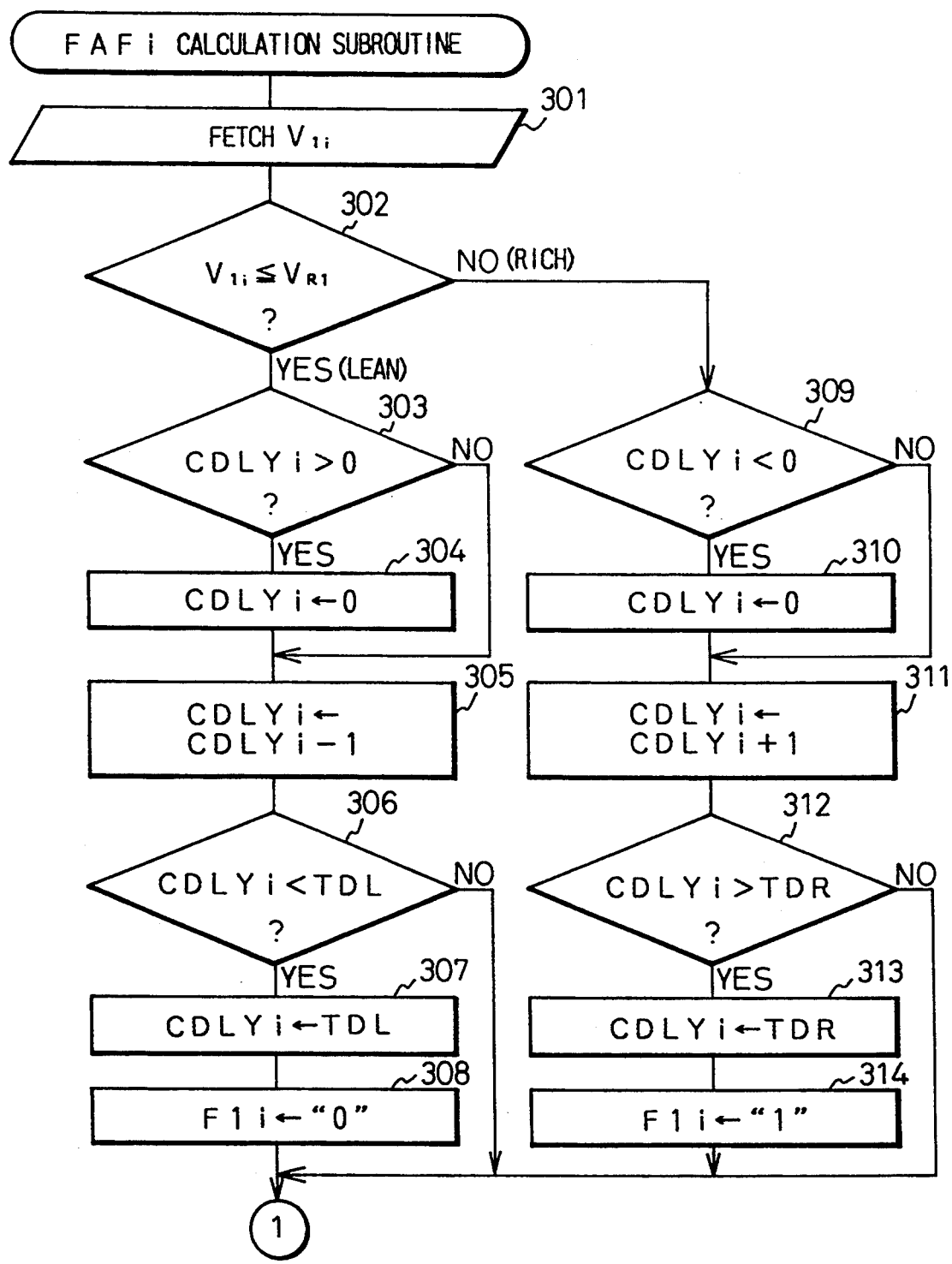
Figure 3B:
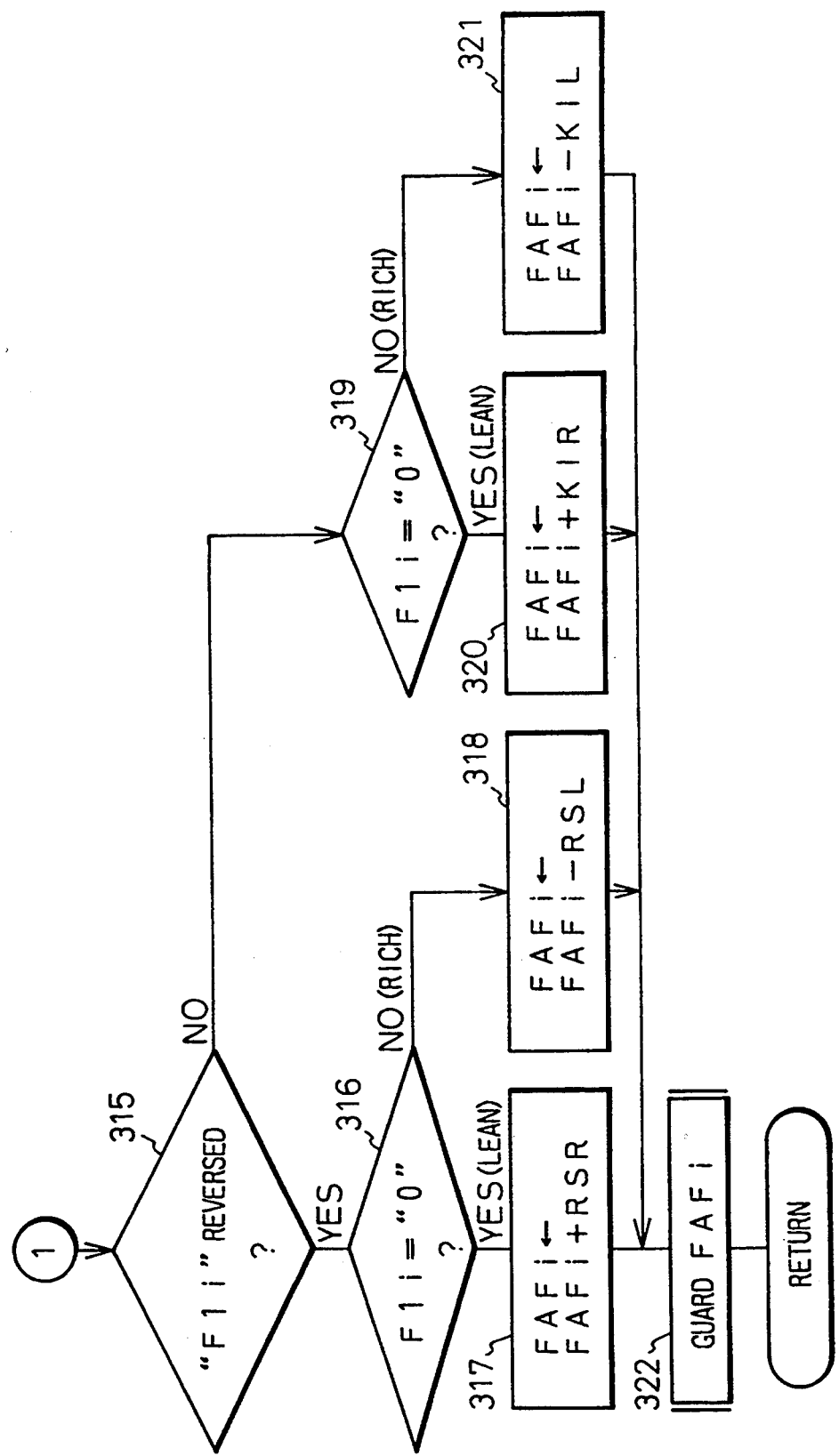

FIGS. 2, 3A and 3B are flowcharts showing routines for the first air-fuel ratio feedback control carried out by the control circuit 10.

FIG. 2 shows a routine for calculating air-fuel ratio correction factors FAFA and FAFB for cylinder banks A and B, respectively, in accordance with the outputs $V_{1A}, V_{1B}$ of the upstream $O_2$ sensors 13A and 13B. This routine is executed at predetermined intervals such as 4 ms.

When the routine starts, at step 201, it is determined whether or not all conditions for air-fuel ratio feedback control are satisfied. The conditions for a feedback control are, for example, the engine is not being started, the coolant temperature is higher than a predetermined value, the air-fuel ratio enrichment, such as a start-up air-fuel ratio enrichment, a warming-up air-fuel ratio enrichment, a power air-fuel ratio enrichment, or an OTP air-fuel ratio enrichment for preventing an excess rise in the temperature of the catalytic converters, are not being carried out, the outputs of the upstream $O_2$ sensors 13A, 13B, have been reversed (i.e., changed from a rich air-fuel ratio output signal to a lean air-fuel ratio output signal or vice versa) at least once, a fuel cut operation is not being carried out.

If any of these conditions is not satisfied, the routine proceeds to step 212 in, which causes an air-fuel ratio feedback control flag XMFB to be zero and the routine terminates at step 213.

If all of the conditions for the feedback control are satisfied at step 201, the routine proceeds to step 202, which resets a flag XW (i.e., XW=0). The value of the flag XW shows the cylinder bank for which the air-fuel ratio correction factor is being calculated by this routine, and XW=0 designates the cylinder bank A, and XW=1 designates the cylinder bank B.

At steps 203 to 206, addressing of RAM 105 is carried out in accordance with the value of the flag XW. That is, if XW=0 at 202, parameters used in the calculation in step 207 are read from a storage area in RAM 105 which is allocated for the bank A, and the calculation results are stored in the same storage area (in this case, the suffix "i" in the subroutine executed at step 207 (FIGS. 3A and 3B) represents letter "A"). Similarly, if XW=1 at 203, calculation in step 207 is carried out using parameters stored in a storage area allocated for the bank B in RAM 105, and the calculation results are stored in the same storage area (in this case, the suffix "i" in the subroutine of FIGS. 3A and 3B represents letter "B").

Then, at step 207, the air-fuel ratio correction factor FAFi is calculated by the subroutine of FIGS. 3A and 3B (in this case, since the flag XW has been reset (XW=0) at step 203, FAFAi represents the air-fuel ratio correction factor FAFA of the bank A). After executing step 207, it is determined whether or not the value of the flag XW is 1. In this case, since the flag XW has been reset (XW=0) at step 202, the routine proceeds to step 210 to set the flag XW (i.e., XW=1). Then steps 203 to 207 are repeated, this time, to calculate air-fuel ratio correction factor FAFB for the bank B. Then the routine proceeds from step 209 to step 211, since the flag XW has been set (XW=1) at step 210 this time. And the routine is terminated at step 213, after setting the air-fuel ratio feedback control flag XMFB to be 1 at step 211. Namely, when this routine is executed, first, the air-fuel ratio correction factor FAFA for the bank A is calculated, then, the air-fuel ratio correction factor FAFB is calculated.

FIGS. 3A and 3B show a flowchart of the subroutine executed at step 207 in FIG. 2 for calculating the air-fuel ratio correction factors FAFA and FAFB. As explained above, the suffix "i" in the flowchart represents letters "A" or "B" in accordance with the value of the flag XW.

In FIG. 3A, when the subroutine is called, an A/D conversion is performed at step 301 upon receiving the output voltage $V_{11}$ of the upstream $O_2$ sensor 13i, and the A/D converted value thereof is then fetched from the A/D converter 101. Then, at step 302, the voltage $V_{11}$ is compared with a reference voltage $V_{R1}$, to thereby determine whether the current air-fuel ratio detected by the upstream $O_2$ sensor 13i is rich or lean with respect to the stoichiometric air-fuel ratio. The reference voltage $V_{R1}$ is usually set at or near the center value of the maximum output of the $O_2$ sensor and, in this embodiment, $V_{R1}$ is set at 0.45 V.

If $V_{11} \leq V_{R1}$, which means that the current air-fuel ratio is lean, the control proceeds to step 303, at which it is determined whether or not the value of a delay counter CDLYi is positive. If CDLYi>0, the control proceeds to step 304, which clears the delay counter CDLYi, and then proceeds to step 305. At step 305, the delay counter CDLYi is counted down by 1, and at step 306, it is determined whether or not CDLYi<TDL. Note that TDL is a lean delay time for which a rich state is maintained even after the output of the upstream $O_2$ sensor 13i changes from rich to lean, and is defined by a negative value. At step 306, only when CDLYi<TDL does the control proceed to step 307, which causes CDLYi to be changed to TDL, and then to step 308, which causes an air-fuel ratio flag F1i to be zero (lean state).

On the other hand, if $V_{1i} > V_{R1}$ at step 302, which means that the current air-fuel ratio is rich, the control proceeds to step 309, which determines whether or not the value of the delay counter CDLYi is negative. If CDLYi<0, the control proceeds to step 310, which clears the delay counter CDLYi, and then proceeds to step 311. If CDLYi≧0, the control directly proceeds to step 311. At step 311, the delay counter CDLYi is counted up by 1, and at step 312, it is determined whether or not CDLYi>TDR. Note that TDR is a rich delay time for which a lean state is maintained even after the output of the upstream $O_2$ sensor 13$i$ changes from lean to rich, and is defined by a positive value. At step 312, only when CDLYi>TDR does the control proceed to step 313, which causes CDLYi to be changed to TDR, and then proceeds to step 314, which causes an air-fuel ratio flag F1 to be 1 (rich state).

Then, at step 315 in FIG. 3B, it is determined whether or not the air-fuel ratio flag F1i is reversed, i.e., whether or not the delayed air-fuel ratio detected by the upstream $O_2$ sensor 13$i$ is reversed. If the air-fuel ratio flag F1i is reversed, the control proceeds to steps 316 to 318, and a skip operation is carried out. That is, if the flag F1i is zero (lean) at step 316, the control proceeds to step 317, which increases the correction factor FAFi by a skip amount RSR.

If the flag F1 is 1 (rich) at step 316, the control proceeds to step 318, which reduces the correction factor FAFi by a skip amount RSL.

If the air-fuel ratio flag F1i is not reversed at step 315, the control proceeds to steps 319 to 321, which carry out an integration operation. That is, if the flag F1i is zero (lean) at step 319, the control proceeds to step 320, which gradually increases the correction factor FAFi by a rich integration amount KIR. Also, if the flag F1i is 1 (rich) at step 319, the control proceeds to step 321, which gradually decreases the correction factor FAFi by a lean integration amount KIL.

Then, at step 322, the air-fuel ratio correction factor FAFi is guarded, for example, by a minimum value of 0.8 and a maximum value of 1.2, thereby preventing the controlled air-fuel ratio from becoming overrich or overlean.

The correction factor FAFi is then stored in the RAM 105 and the subroutine terminates.

As explained above, the subroutine in FIGS. 3A and 3B is executed for the cylinder bank A and the cylinder bank B alternately. Consequently, the air-fuel ratio correction factors FAFA and FAFB are calculated separately to perform air-fuel ratio control of cylinder bank A and B independently.

The control operation shown in the flowcharts of FIGS. 3A and 3B are further explained with reference to FIGS. 4, A through D. FIGS. 4A through 4D are timing diagrams showing changes of various parameters in the air-fuel ratio control of the cylinder bank A by the flowchart of FIGS. 3A and 3B. Though FIGS. 4A through 4D show the diagrams for cylinder bank A, same can be applied to the cylinder bank B.

As illustrated in FIG. 4A, when the air-fuel ratio signal A/F is obtained by the output of the upstream $O_2$ sensor 13A, the delay counter CDLYA is counted up when the upstream $O_2$ sensor 13A indicates a rich state, and is counted down when it indicates a lean state, as illustrated in FIG. 4B. As a result, a delayed air-fuel ratio corresponding to the air-fuel ratio flag F1A is obtained as illustrated in FIG. 4C.

For example, at time $t_1$, even when the air-fuel ratio A/F changes from lean to rich, the delayed air-fuel ratio A/F' (F1A) changes at time $t_2$ after the rich delay time TDR. Similarly, at time $t_3$ even when the air-fuel ratio A/F changes from rich to lean, the delayed air-fuel ratio A/F' (F1A) changes at time $t_4$ after the lean delay time TD1. At time $t_5$, $t_6$, or $t_7$, however, when the air-fuel ratio A/F is reversed in a shorter time than the rich delay time TDR or the lean delay time TDL, the delayed air-fuel ratio F1A is reversed at time $t_8$. That is, the delayed air-fuel ratio A/F' (F1A) is stable when compared with the air-fuel ratio A/F.

(2) A second air-fuel ratio control

Next, the air-fuel ratio feedback control based on the output of the downstream $O_2$ sensor 17 is explained.

Generally, three types of air-fuel ratio feedback control operations by the downstream $O_2$ sensor 17 are used, i.e., the operation type in which one or more of the parameters such as the skip amount RSR, RSL, integration amounts KIR, KIL and delay times TDR, TDL are adjusted in accordance with the output of the downstream $O_2$ sensor, the operation type in which the reference voltage $V_{RI}$ for the outputs $V_{1A}$, $V_{1B}$ of the upstream $O_2$ sensors 13A, 13B are adjusted in accordance with the output of the downstream $O_2$ sensor, and the operation type in which a second air-fuel ratio correction factor FAF2, which is calculated based on the output of the downstream $O_2$ sensor 17, is introduced.

For example, if the rich skip amount RSR is increased, or if the lean skip amount RSL is decreased, the controlled air-fuel ratio becomes richer, and if the lean skip amount RSL is increased or if the rich skip amount RSR is decreased, the controlled air-fuel ratio becomes leaner. Thus, the air-fuel ratio can be controlled by changing the rich skip amount RSR and the lean skip amount RSL in accordance with the output of the downstream $O_2$ sensor 17.

Further, if the rich integration amount KIR is increased or if the lean integration amount KIL is decreased, the controlled air-fuel ratio becomes richer, and if the lean integration amount KIL is increased or if the rich integration amount KIR is decreased, the controlled air-fuel ratio becomes leaner. Thus, the air-fuel ratio can be controlled by changing the rich integration amount KIR and the lean integration amount KIL in accordance with the output of the downstream $O_2$ sensor 17.

Further, if the reference voltage $V_{R1}$ is increased, the controlled air-fuel ratio becomes richer, and if the reference voltage $V_{R1}$ is decreased, the controlled air-fuel ratio becomes leaner. Thus, the air-fuel ratio can be controlled by changing the reference voltage $V_{R1}$ in accordance with the output of the downstream $O_2$ sensor 17.

Also, if the rich delay time becomes longer than the lean delay time (i.e., TDR>TDL), the controlled air-fuel ratio becomes richer, and if the lean delay time becomes longer than the rich delay time (i.e., TDL>TDR), the controlled air-fuel ratio becomes leaner. Thus, the air-fuel ratio can be controlled by changing the rich delay time TDR and the lean delay time TDL in accordance with the output of the downstream $O_2$ sensor 17.

These types of air-fuel ratio control operations have respective advantages. For example, if the delay times TDR, TDL are adjusted, a precise control of the air-fuel ratio can be obtained, and if the skip amounts RSR, RSL are adjusted, the response of the control is improved. Naturally, two or more of these types of operation can be used at the same time.

Figure 5B:
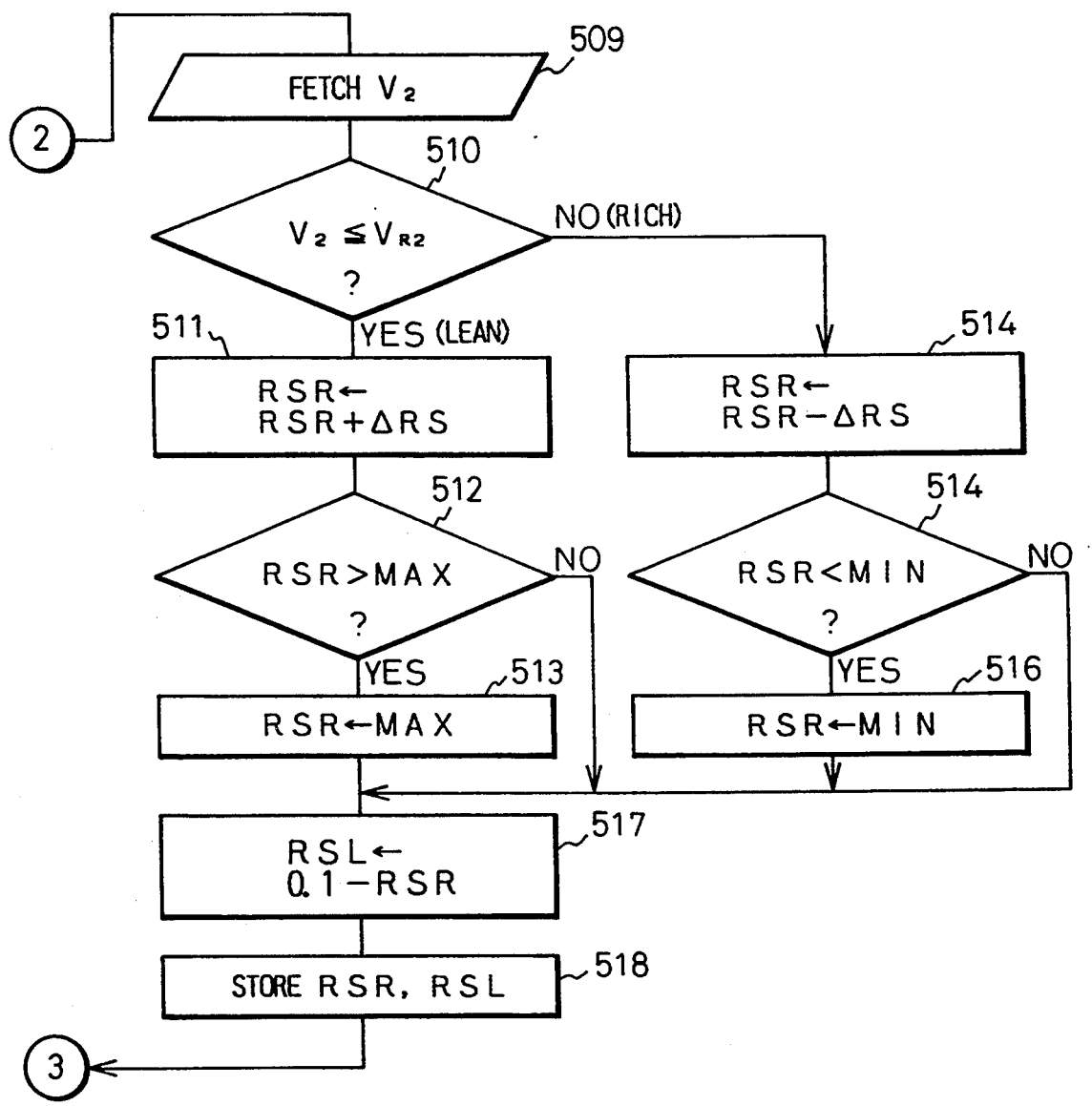

FIGS. 5A and 5B show a flowchart of the control operation of the double $O_2$ sensor system of the present embodiment in which the skip amounts RSR, RSL are adjusted in accordance with the output $V_2$ of the downstream $O_2$ sensor 17. This routine is executed at predetermined intervals of, e.g., 512 ms.

The steps from 501 to 506 of FIG. 5A show the operation for determining whether or not the conditions for executing the feedback control based on the output of the downstream $O_2$ sensor 17 are satisfied.

These conditions are,
the conditions for executing the air-fuel ratio feedback control based on the output of the upstream $O_2$ sensors 13A, 13B are satisfied (the air-fuel ratio feedback control flag XMFB=1 at step 501),
the temperature THW of the coolant is higher than a predetermined value (e.g., 70° C.), (step 502),
the throttle valve 18 is not fully closed (i.e., the signal LL is not 1), (step 503),
secondary air AS is not being introduced into the exhaust manifold, (step 504),
the load of the engine represented by Q/Ne is more than a predetermined value $X_1$ (i.e., Q/Ne$\geq X_1$). (step 505),
the downstream $O_2$ sensor 17 is activated (step 506).

If any of these conditions are not satisfied, the routine proceeds to step 519 in which an air-fuel ratio feedback control flag XSFB is reset (=0).

If all of the conditions of steps 501 to 506 are satisfied, the flag XSFB is set (=1) at step 508, and the routine proceeds to step 509 of FIG. 5B.

The steps 509 through 518 illustrate the operation for calculating the skip amounts RSR or RSL in accordance with the output $V_2$ of the downstream $O_2$ sensor 17.

At step 509, an A/D conversion is performed on the output voltage $V_2$ of the downstream $O_2$ sensor 17, and the A/D converted value thereof is then fetched from the A/D converter 101.

Then at step 510, the voltage $V_2$ is compared with a reference voltage $V_{R2}$ such as 0.55 v, to determine whether the current air-fuel ratio detected by the downstream $O_2$ sensor 17 is rich or lean with respect to the stoichiometric air-fuel ratio. Note that the reference voltage $V_{R2}$ (=0.55 V) is preferably higher than the reference voltage $V_{R1}$ (=0.45 V), in consideration of the difference in output characteristics and deterioration speed between the $O_2$ sensors 13A, 13B upstream of the catalytic converter and the $O_2$ sensor 17 downstream of the catalytic converter.

If $V_2 \leq V_{R2}$ (lean state) at step 510, then the routine proceeds to steps 511 to 513, and if $V_2 > V_{R2}$ (rich state), the routine proceeds to steps 514 to 516. Namely, at step 511, the rich skip amount RSR is increased by ΔRS (constant value), to thereby make the air-fuel ratio to rich.

Then, at steps 512 and 513, the rich skip amount RSR is guarded by a maximum value MAX (e.g., approximately 0.075). On the other hand, at step 514, the rich skip amount is decreased by ΔRS, to thereby make the air-fuel ratio lean. Then, at steps 515 and 516, the rich skip amount RSR is guarded by a minimum value MIN (e.g., approximately 0.025). The maximum value MAX is selected so that the amount of change of the air-fuel ratio is maintained within a range that does not reduce driveability, and the minimum value MIN is selected so that the response of the control in a transient condition is not reduced.

At step 517, the lean skip amount RSL is calculated by $$RSL \leftarrow 0.1 - RSR$$

Namely, the sum of RSR and RSL is maintained at 0.1. Then at step 518, the skip amounts RSR and RSL are stored in the backup RAM 106, and the routine terminates at step 520 in FIG. 5A.

FIG. 6 shows a routine for calculating the fuel injection amount using the air-fuel ratio correction factors FAFA and FAFB calculated by the routine of FIGS. 3A and 3B.

At step 601, a basic fuel injection amount TAUP is calculated in accordance with the amount of the inlet air per one revolution of the engine, Q/Ne, by $$TAUP \leftarrow \alpha \cdot Q/Ne$$

where, TAUP is the fuel injection amount required to obtain a stoichiometric air-fuel ratio and $\alpha$ is a predetermined constant.

Then, at step 602, a fuel injection amount TAUA for cylinder bank A is calculated by $$TAUA \leftarrow TAUP \cdot FAFA \cdot \beta + \gamma$$

where, $\beta$ and $\gamma$ are correction factors determined by operating conditions of the engine. The calculated TAU is set into the down counter 108A of the cylinder bank A and a flip-flop 109A is set, at step 603, whereby fuel injection is started in the cylinder bank A. Similarly, at step 604, 605, a fuel injection amount TAUB for the cylinder bank B is calculated and set into the down counter 108B for the cylinder bank B, whereby fuel injection is started in the cylinder bank B.

As stated before, when the time corresponding to TAUA or TAUB has lapsed, the flip-flop 109A or 109B is reset by the signal from the down counter 108A or 108B, whereby the fuel injection is terminated.

The constants $\alpha$, $\beta$, $\gamma$ in steps 601, 602, 604 can be set at different values for cylinder banks A and B.

(3) A detecting operation of the catalyst deterioration based on the output of the downstream $O_2$ sensor 17

Next, the detecting operation of deterioration of the catalytic converter based on the downstream $O_2$ sensor 17 according to the present invention is explained.

As explained above, air-fuel ratio of the cylinder banks A and B are separately feedback controlled in this embodiment, and usually, the periods of cycles of the respective feedback control are slightly different in the respective cylinder banks. Therefore, the phases of the air-fuel ratio oscillations of the respective cylinder banks are not synchronized. However, the difference of the phases of the air-fuel ratio oscillations of the cylinder banks is always changing during the operation of the engine, due to the difference of the periods of the air-fuel ratio oscillation cycles in the respective cylinder banks. Consequently, during operation of the engine, there exist occasional periods in which the phases of the air-fuel ratio oscillations of the respective cylinder banks are substantially synchronized, without any compulsory synchronizing operation.

In the following embodiments, the control circuit 10 detects such a spontaneous synchronization, and determines whether or not the catalytic converter has deteriorated when such a spontaneous synchronization occurs.

In the explanation hereinafter, the detecting operation of deterioration of the catalytic converter is explained in two operation stages, i.e., (A) detection of the synchronization of the air-fuel ratio oscillations in the respective cylinder banks; and, (B) detection of deterioration of the catalytic converter.

(A) Detection of the Synchronization of the Air-fuel Ratio Oscillations in the Cylinder Banks Three alternative methods for detecting the synchronization of the air-fuel ratio oscillations in the cylinder banks, are available, i.e., ① A method using the air-fuel ratio correction factors FAFA, FAFB, ② A method using the output of the upstream $O_2$ sensor 13A, 13B, and ③ A method using the difference in timing of the rich skips RSR or the lean skips RSL of the air-fuel ratio control of the cylinder banks, are explained.

① A method for detecting the synchronization of the air-fuel ratio oscillations of the cylinder banks, based on the air-fuel ratio correction factors.

FIGS. 7A and 7B are timing diagrams similar to FIG. 4D, which show the oscillations of the air-fuel ratio correction factors FAFA (FIG. 7A), and FAFB (FIG. 7B), during the air-fuel ratio feedback control. FIGS. 7A and 7B represent the case in which FAFA and FAFB are out of phase by a time $t_D$ as shown in the drawings. FIG. 7C is a timing diagram showing the change in the FAFADD which is a sum of FAFA and FAFB in FIGS. 7A and 7B (FAFADD=FAFA+FAFB). The waveform of FAFADD when FAFA and FAFB are not synchronized, becomes as shown in FIG. 7C by a solid line.

On the other hand, if the phase of the oscillation of FAFA shifts by $t_D$ relative to the phase of the oscillation of FAFB, i.e., if the phases of FAFA and FAFB are synchronized, the waveform of FAFADD becomes as indicated by dotted line in FIG. 7C.

As seen from FIG. 7C, when FAFA and FAFB are synchronized, the waveform of FAFADD becomes similar to those of FAFA and FAFB, and the amplitude DFAF of FAFADD becomes maximum (FIG. 7C). Further, the timing at which FAFADD becomes maximum or minimum coincides with the timing at which FAFA or FAFB become maximum or minimum (i.e., immediately before the rich skips or lean skips in FAFA and FAFB).

Consider that the rich skips and lean skips occur in FAFA at time TRA and TLA, respectively (refer to FIG. 7A), and represent the value of FAFADD at time TRA and TLA by FRICHA and FLEANA, respectively. Also represent the difference between FRICHA and FLEANA by DFAFA (DFAFA=|FRICHA−FLEANA|). (Refer to FIG. 7C.)

Similarly, consider TRB, TLB, FRICHB, FLEANB, and DFAFB in similar manner. (Refer to FIG. 7B and 7C.)

As understood from FIG. 7A through 7C, DFAFA and DFAFB become larger as the difference between the phases of FAFA and FAFB becomes small, and take their maximum values when the phases of FAFA and FAFB are synchronized.

Therefore, when the values of DFAFA and DFAFB become larger than a certain value, it can be determined that the phases of FAFA and FAFB are synchronized.

Figure 8:
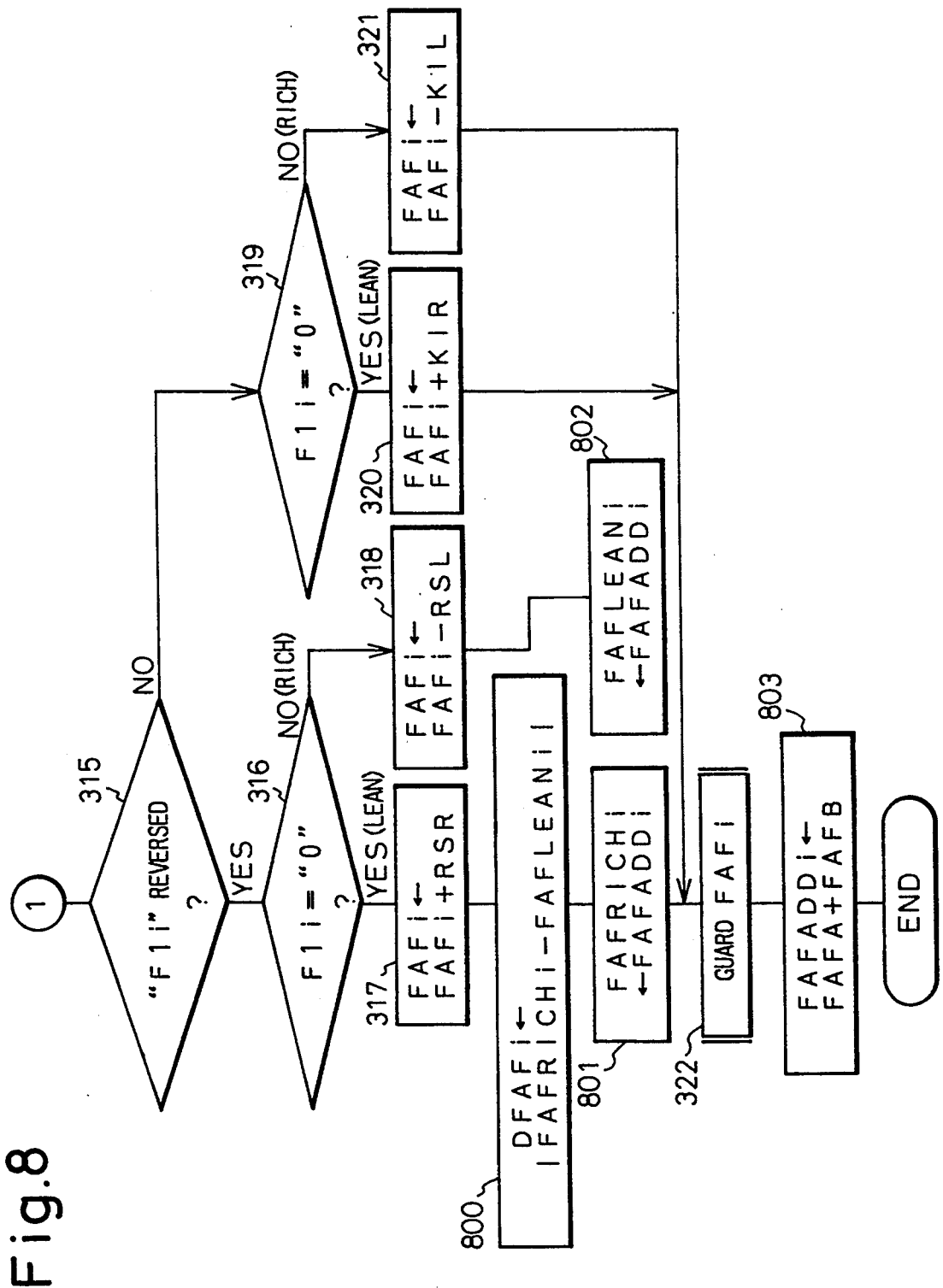
FIGS. 8 through 13 are flowcharts showing embodiments of operation for detecting the synchronization of the phases of air-fuel ratio oscillations of exhaust gases according to the present invention.
Figure 9:
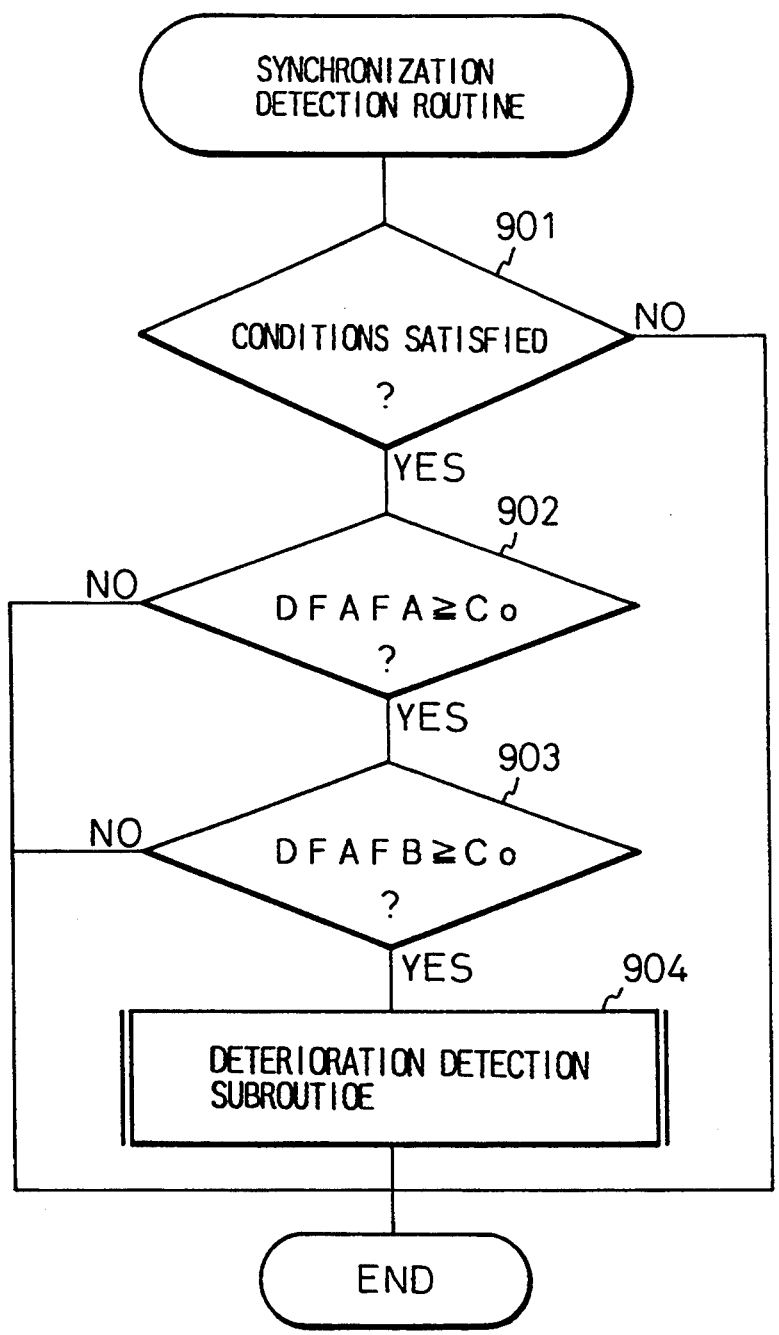

FIGS. 8 and 9 are flowcharts showing the operation of the control circuit 10 for detecting the synchronization of the air-fuel ratio oscillations of the cylinder banks A and B. In this embodiment, calculation of DFAFA and DFAFB are performed as a part of the air-fuel ratio feedback control routine of FIG. 3A and 3B, and for this purpose, the flowchart in FIG. 3B is modified as shown in FIG. 8.

In FIG. 8, steps 800 through 803 are added to the steps 315 to 322 in FIG. 3B for calculating DFAFA and DFAFB. In FIG. 8, FAFADDi ("i" designates the letter "A" or "B" in accordance with the value of the flag XW) is calculated at step 803 when the air-fuel ratio correction factors of the respective cylinder banks are calculated. Also, the values of FRICHi and FLEANi are updated when the rich skips and the lean skips occur, respectively (steps 801 and 802). Note that the value of FAFADDi used for updating FRICHi and FLEANi is the value of FAFADDi when the routine was last executed (i.e., the values immediately before the rich skips and the lean skips are carried out).

In FIG. 8, DFAFi is calculated at step 800 every time when the rich skip occurs at step 317. Also, note that the values of FRICHi and FLEANi used for the calculation of DFAFi at step 800 are the values when the rich skip and the lean skip were last performed (i.e., the values immediately before the rich skips and the lean skips are carried out).

FIG. 9 shows a flowchart of an operation of the control circuit 10 for detecting the synchronization, based on DFAFA and DFAFB calculated in FIG. 8. This routine is executed at predetermined intervals (e.g., 4 ms).

In FIG. 9, when the routine starts, at step 901, it is determined whether or not the conditions for performing the detection of the catalyst deterioration are satisfied. The conditions for performing the detection of the catalyst deterioration are, for example, the first air-fuel ratio feedback control based on the upstream $O_2$ sensors is being carried out (i.e., air-fuel ratio feedback control flag XMFB=1), the outputs $V_{1A}$, $V_{1B}$ of the upstream $O_2$ sensors 13A and 13B are not staying at rich or lean compared with the stoichiometric air-fuel ratio for more than a predetermined time, the second air-fuel ratio feedback control based on the downstream $O_2$ sensor is being carried out (i.e., air-fuel ratio feedback control flag XSFB=1 ), If any of the above conditions is not satisfied, the routine terminates without detecting the synchronization or the catalyst deterioration. When all of the conditions are satisfied at step 901, the routine proceeds to steps 902, 903 which determine whether or not DFAFA and DFAFB, respectively, are larger than or equal to a predetermined value $C_0$, where, $C_0$ is a constant determined, preferably by experiment, in accordance with the types and locations of the $O_2$ sensors and the engine type.

If both DFAFA and DFAFB are larger than $C_0$, since this means that the phases of the air-fuel ratio oscillations of the both cylinder banks are being synchronized, the routine proceeds to step 904.

At step 904, a subroutine for detecting the deterioration of catalytic converter is called. This subroutine is explained later in detail.

As explained above, a spontaneous synchronization of the phases of the air-fuel ratio oscillations of the cylinder banks can be detected based on the air-fuel ratio correction factors of the respective cylinder banks, and the deterioration of the catalytic converter can be detected when such a synchronization occurs without forcing the phases of the air-fuel ratio feedback controls of the respective cylinder banks to synchronize.

② A method for detecting the synchronization of the air-fuel ratio oscillations of the cylinder banks, based on the outputs of the upstream $O_2$ sensors.

In the above embodiment, the amplitude DFAF of FAFADD, which is the amplitude of the sum of the air-fuel ratio correction factor FAFA and FAFB of the cylinder banks A and B, is used for detecting the synchronization of the phases of the air-fuel ratio oscillations. However, it is also possible to detect the synchronization in similar manner based on the outputs $V_{1A}$, $V_{1B}$ of the upstream $O_2$ sensors 13A and 13B. If the sum of the output voltages $V_{1A}$ and $V_{1B}$ of the upstream $O_2$ sensor 13A and 13B is represented by OXADD (i.e., OXADD=$V_{1A}+V_{1B}$), the amplitude of the waveform of OXADD becomes maximum when the phases of the oscillation of $V_{1A}$ and $V_{1B}$ are synchronized. Namely, when the amplitude of OXADD becomes larger than a certain value, it can be determined that the phases of air-fuel ratio oscillations of the cylinder banks A and B are synchronized.

In this embodiment, the control circuit 10 in FIG. 1 calculates OXADD and the amplitude DOXADD thereof, and determines that the synchronization is occurring when the amplitude DOXADD becomes larger than or equal to a predetermined value.

Figure 10:
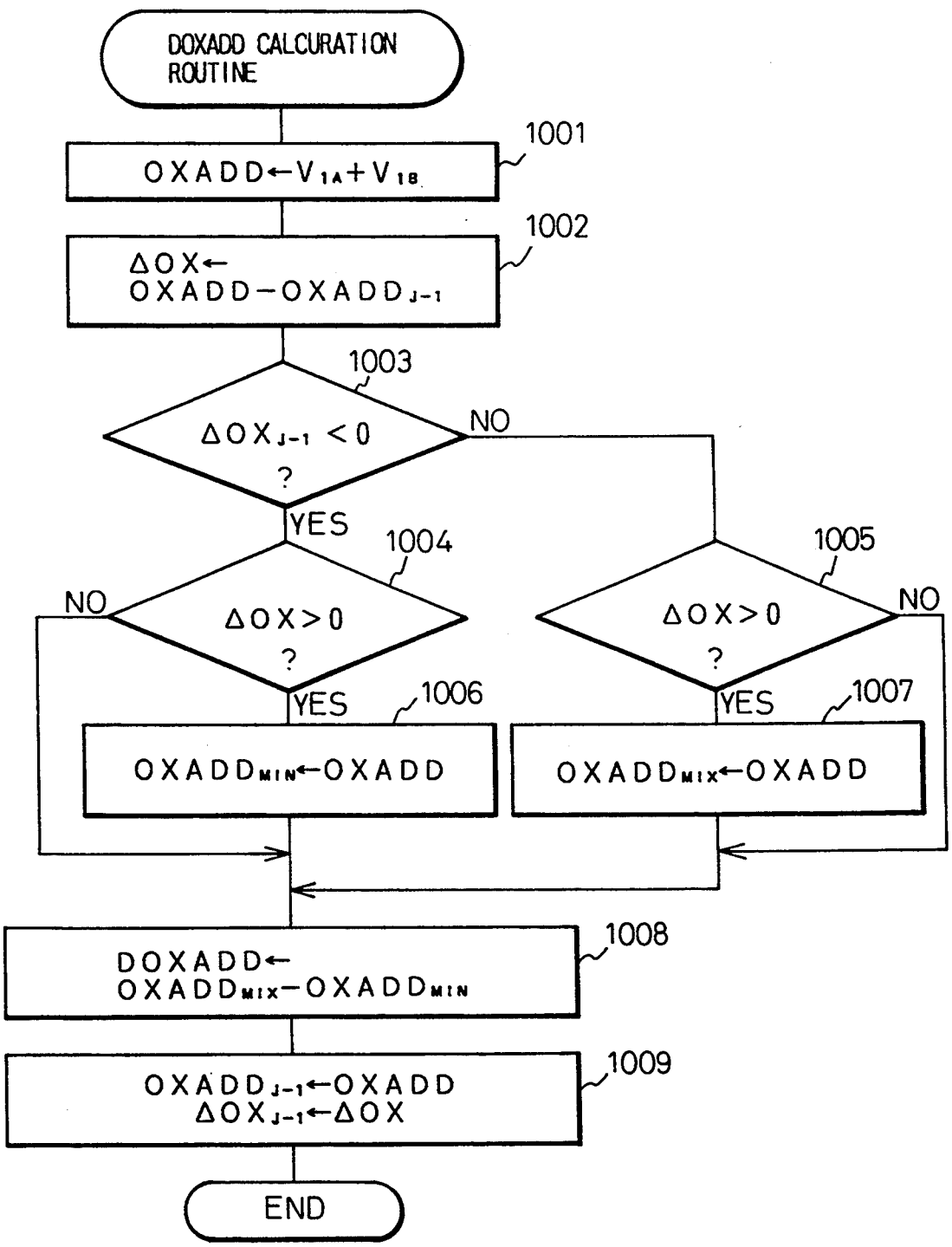
Figure 11:
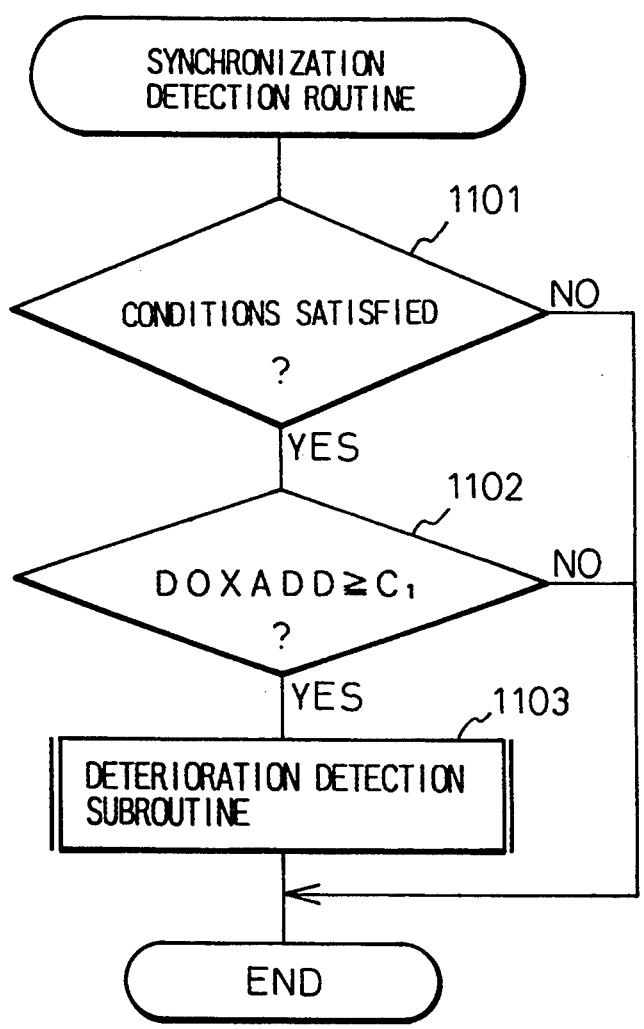

FIGS. 10 and 11 show flowcharts of the operation for detecting the synchronization according to the procedure explained above.

FIG. 10 shows a routine for calculating DOXADD. In this embodiment, this routine is executed at same intervals as the air-fuel ratio feedback control routine in FIGS. 3A, 3B (e.g., 4 ms), but this routine also may be executed as a part of the air-fuel ratio feedback control routine (e.g., between steps 301 and 302 in FIG. 3A).

In FIG. 10, when the routine starts, the sum of the outputs $V_{1A}$ and $V_{1B}$ is calculated at step 1001, and stored in the RAM 105 as OXADD. Then, at steps 1002 to 1007, the maximum value (OXADD$_{MAX}$) and the minimum value (OXADD$_{MIN}$) of OXADD are updated. Namely, at step 1002, the difference ($\Delta$OX) between the current value of OXADD and the same in the last execution of the routine is calculated. Then, at steps 1003 to 1005, it is determined whether or not the current value of OXADD is maximum or minimum using present value of $\Delta$OX and the value of $\Delta$OX in the last execution of the routine. If the value of OXADD is determined maximum or minimum, the values of OXADD$_{MAX}$ and OXADD$_{MIN}$ are updated accordingly at steps 1006 and 1007. Note that, the suffix "j−1" in this flowchart represent the values when the routine was last executed.

After the updating of the values of OXADD$_{MAX}$ and OXADD$_{MIN}$, at step 1008, the amplitude DOXADD of OXADD is calculated by, $$DOXADD = OXADD_{MAX} - OXADD_{MIN}.$$

Then, the routine terminates after updating the parameters at step 1009, to prepare for the next execution.

FIG. 11 shows a routine for detecting the synchronization in accordance with the amplitude calculated by the routine in FIG. 10. This routine is also executed by the control circuit 10 at predetermined intervals(e.g., 4 ms).

In FIG. 11, step 1101 shows a same operation as step 901 in FIG. 9 (determination of whether or not the conditions for performing the detecting operation of the catalyst deterioration are satisfied). Step 1102 15 shows the determination of whether or not the synchronization of the phases of air-fuel ratio oscillations is occurring. At step 1102, when the amplitude DOXADD is larger than or equal to a value $C_2$, it is determined that the synchronization is occurring, and the routine proceeds to step 1103 which executes the subroutine for detecting the catalyst deterioration.

The value $C_1$ in step 1102 is a constant determined in accordance with types of the upstream $O_2$ sensors. The subroutine in step 1103 is explained later in detail.

③ A method for detecting the synchronization of the air-fuel ratio oscillations of the cylinder banks, based on the difference in timing between the skip operations in the air-fuel ratio control of the respective cylinder banks.

In this embodiment, the synchronization of the phases of the air-fuel ratio oscillations is detected based on the time difference of the rich skips RSR or lean skips RSL of the air-fuel ratio feedback control of the cylinder banks A and B. If the phases of the air-fuel ratio oscillations of the respective cylinder banks are synchronized, the rich skips and the lean skips in the cylinder banks occur at same time, and the time difference of the skips in the air-fuel ratio feedback control of both cylinder banks becomes zero. In this embodiment, the control circuit 10 calculates the time difference TIMEINT of the skips in the air-fuel ratio feedback control of the cylinder banks A and B, and determines that the synchronization occurs when the time difference TIMEINT becomes smaller than a predetermined value.

Figure 12:
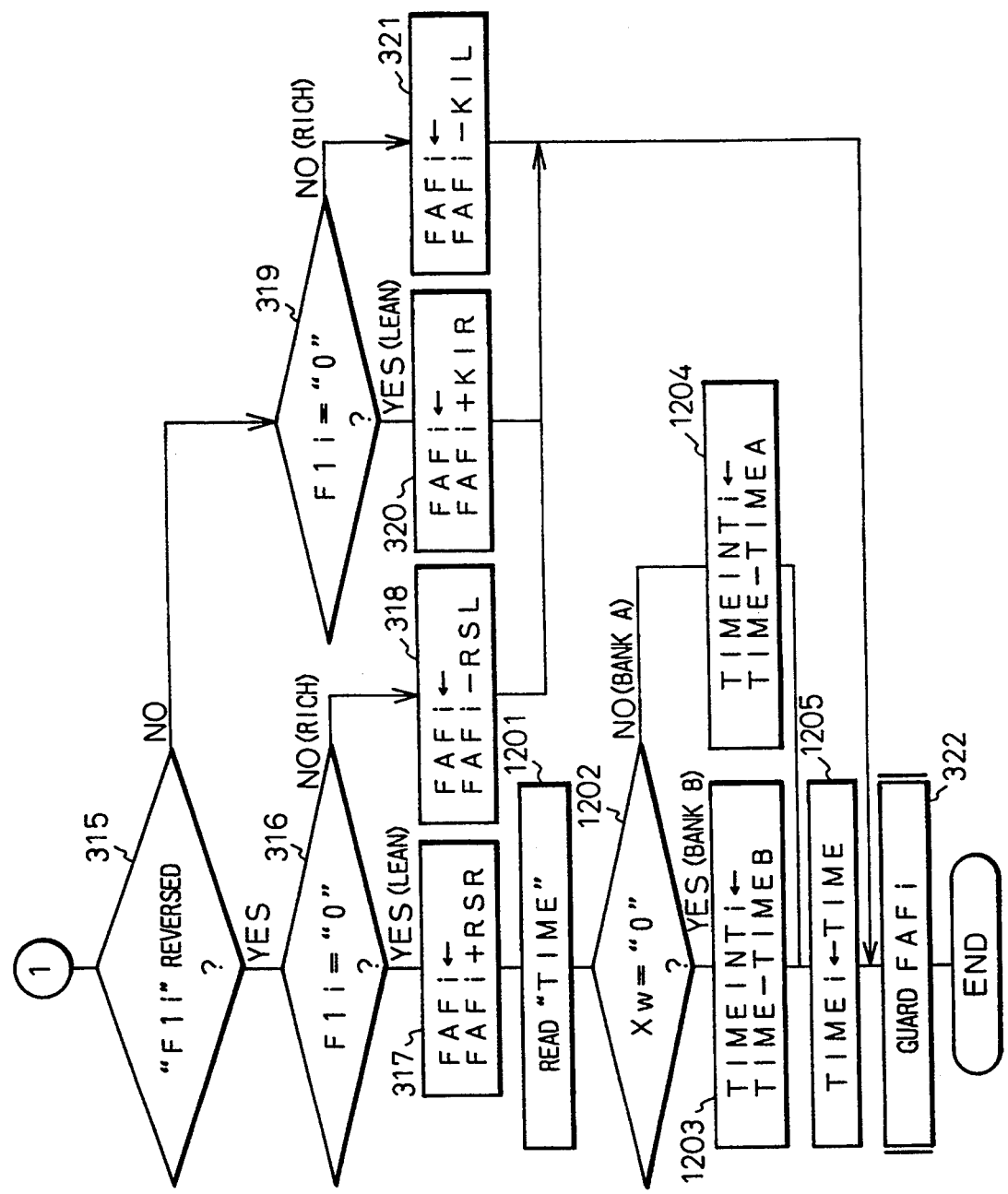
Figure 13:
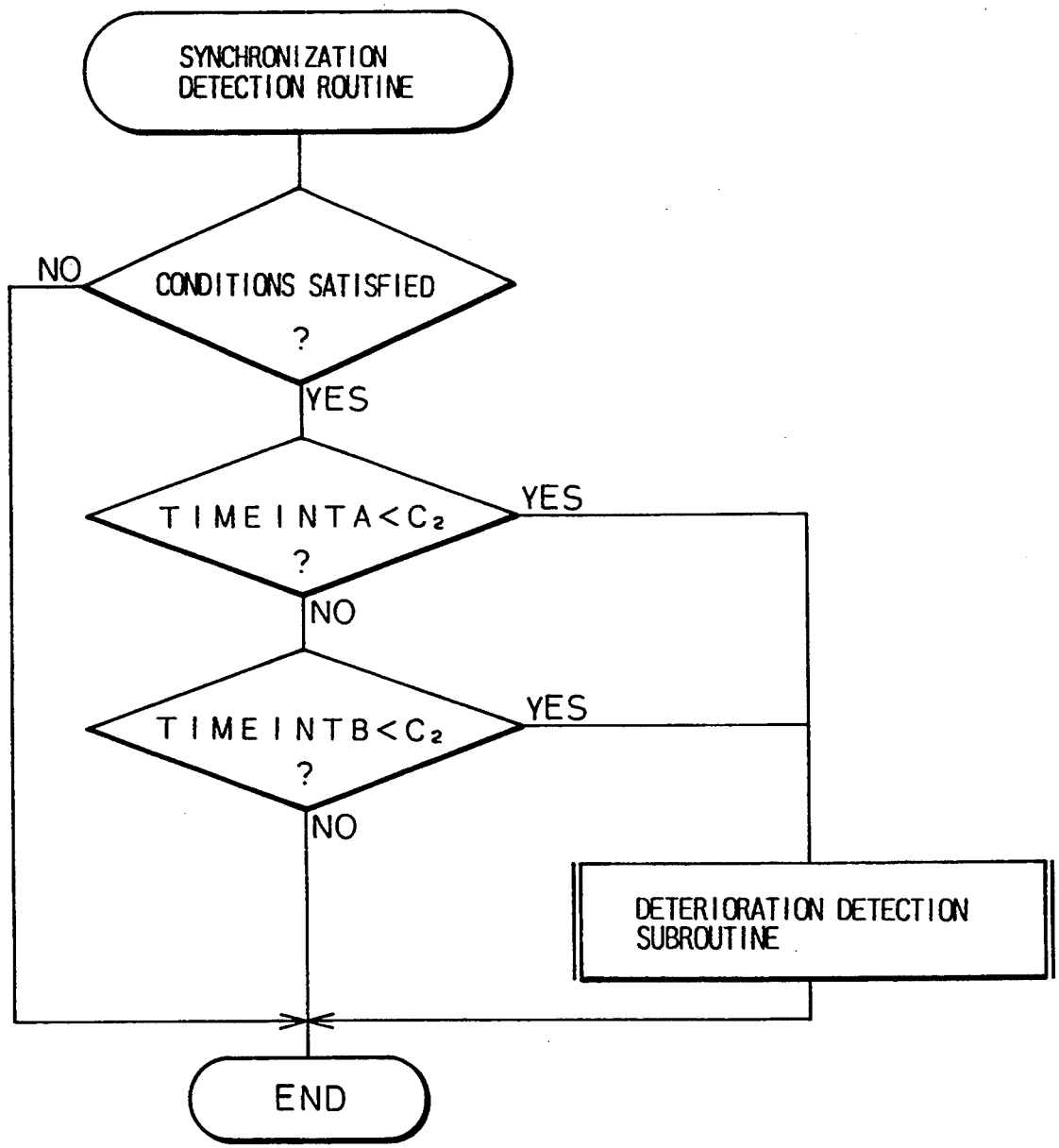

FIGS. 12 and 13 show flowcharts of the operation for detecting the synchronization according to the procedure explained above.

In this embodiment, calculation of the time difference TIMEINT is performed as a part of the air-fuel ratio feedback control routine of FIGS. 3A and 3B, and for this purpose, the flowchart in FIG. 3A is modified as shown in FIG. 12. That is, in FIG. 12, steps 1201 through 1205 are added to steps 315 to 322 in FIG. 3B to calculate TIMEINTA and TIMEINTB where TIMEINTA represents the time lapse from a rich skip in the cylinder bank B to a rich skip in the cylinder bank A, and TIMEINTB represents the time lapse from a rich skip in the cylinder bank A to a rich skip in the cylinder bank B.

In FIG. 12, at step 1201, the present time ("TIME") is read from a clock incorporated in the control circuit 10 in FIG. 1. The present time, i.e.,"TIME", is read at every rich skip (step 317) in both cylinder banks. Then at step 1202, the cylinder bank, on which the rich skip occurs is determined from the value of the flag XW where XW=0 means that the rich skip occurred in the cylinder bank A, and XW=1 means that the rich skip occurred in the cylinder bank B. At steps 1203 and 1204, TIMEINTi which represents the time difference between two successive rich skips occurring in different cylinder banks. The suffix "i" represents the letter "A" when XW=0, and the letter "B" when XW=1. Further, TIMEA and TIMEB are times stored at step 1205, i.e., times at which the rich skip occurs in the cylinder bank A and B, respectively. Therefore, as seen from steps 1204 and 1205, TIMEINTA and TIMEINTB are calculated every time when the rich skip occurs in the respective cylinder banks by the routine in FIG. 12.

FIG. 13 shows a flowchart of an operation of the control circuit 10 for detecting the synchronization, based on TIMEINTA and TIMEINTB calculated in FIG. 12. This routine is also executed at predetermined intervals (e.g., 4 ms) by the control circuit 10.

In FIG. 13, step 1301 shows a operation for determining whether or not the conditions for performing the detection of the catalytic converter deterioration are satisfied. The conditions are the same as those of step 901 in FIG. 9 and step 1101 in FIG. 11. Steps 1302, and 1303 show the operations for determining whether or not the spontaneous synchronization of the phases of the cylinder banks A and B is occurring. Namely, at steps 1302 and 1303, it is determined whether or not either TIMEINTA or TIMEINTB is smaller than a predetermined value $C_2$. When either TIMEINTA or TIMEINTB is smaller than $C_2$, it is determined that the spontaneous synchronization is occurring, and the routine proceeds to step 1304 to perform a subroutine for detecting the catalyst deterioration.

$C_2$ in steps 1302 and 1303 is an appropriate value which can be considered that the phases of the air-fuel ratio oscillations are substantially synchronized. For example, in this embodiment, $C_2$ is set at about 150 ms. The subroutine in step 1304 will be explained later in detail.

(B) The Operation for Detecting the Deterioration of the Catalytic Converter

In the subroutine of steps 907, 1103 and 1304 in FIGS. 9, 11 and 13, respectively, various methods can be used for detecting the deterioration of the catalytic converter. In the following description, three typical methods, i.e.; a method using the number of reversals of the output signal of the downstream $O_2$ sensor; a method using the lengths of the output signal response curves of the downstream $O_2$ sensor; and a method using the lengths and areas of the output signal response curves of the upstream and downstream $O_2$ sensor, are explained with reference to FIGS. 14 through 21.

① A method for detecting the deterioration of the catalytic converter using the number of reversals of the output signal of the downstream $O_2$ sensor.

Figure 14:
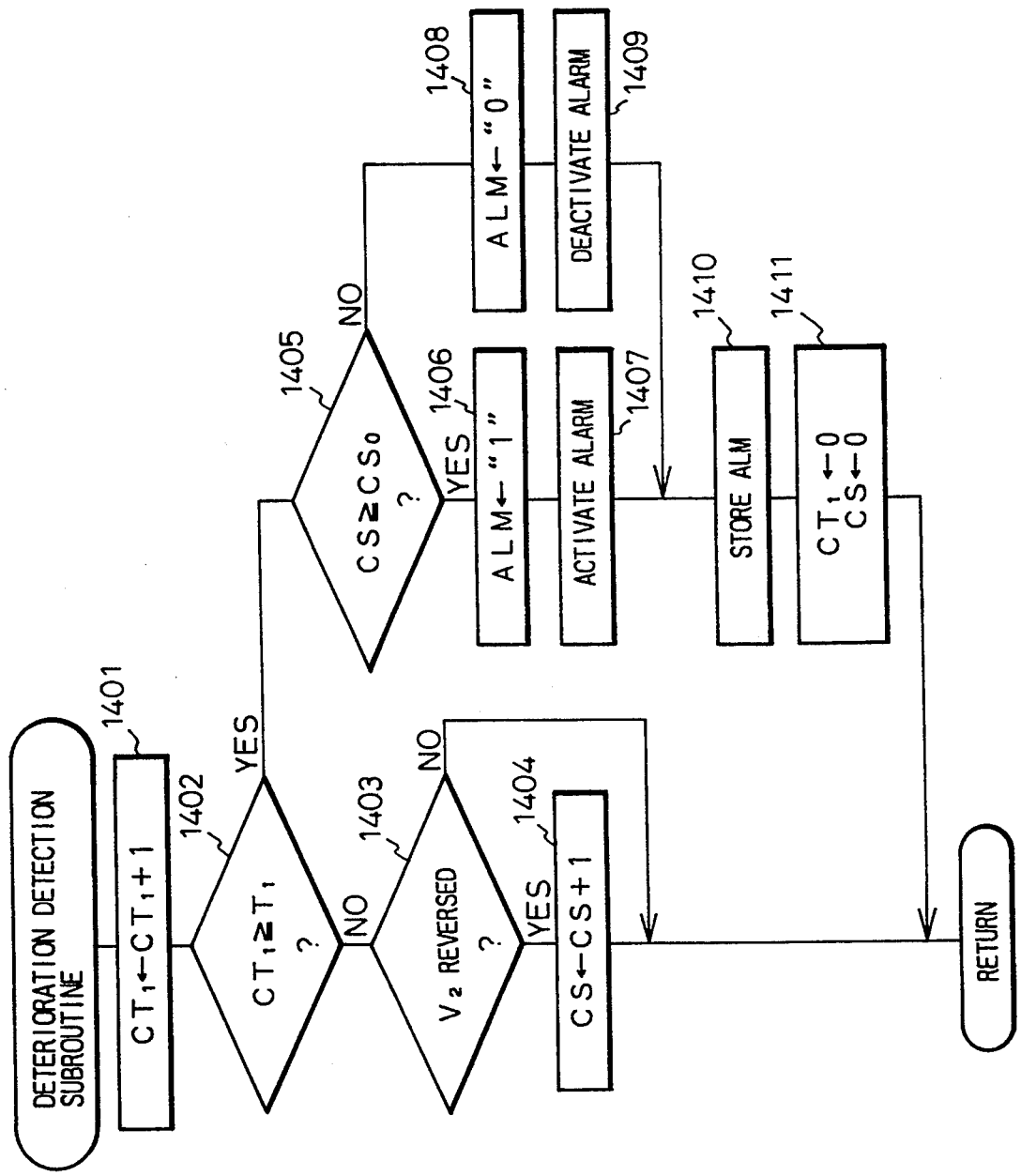

As explained before, as the deterioration of the catalytic converter proceeds, the number of the reversals of the output signal of the downstream $O_2$ sensor within a predetermined period becomes larger. FIG. 14 shows a flowchart of the operation for detecting the deterioration of the catalytic converter utilizing this phenomenon.

In FIG. 14, when the subroutine starts, a counter $CT_1$ is counted up by 1 at step 1401. Then, at step 1402, it is determined whether or not the value of the counter $CT_1$ after count up is larger than or equal to $T_1$, where, $T_1$ is the value corresponding to a predetermined time period for the execution of the detecting operation.

If $CT_1 < T_1$ at step 1402 (i.e., the time period $T_1$ has not yet lapsed), the routine proceeds to step 1403, which determines whether or not the output $V_2$ of the downstream $O_2$ sensor 17 has reversed (i.e., changed from the rich air-fuel ratio signal ($V_2 \geq V_{R2}$) to the lean air-fuel ratio signal ($V_2 < V_{R2}$), or vice-versa.) compared with the value of $V_2$ when the subroutine was last executed, and if the output $V_2$ has reversed, a counter CS is counted up by 1 at step 1404. The counter CS represents the number of reversals of the output $V_2$ during a predetermined time period $T_1$.

If the time period $T_1$ has lapsed (i.e., $CT_1 \geq T_1$ at step 1402), the routine proceeds to step 1405, which determines whether or not the catalytic converter has deteriorated by comparing the value of the counter CS with a predetermined value $CS_0$.

If $CS \geq CS_0$, which means the number of reversals of the output signal $V_2$ of the downstream $O_2$ sensor 17 over the predetermined time period $T_1$ is larger than a predetermined value, it can be considered that the catalytic converter has deteriorated. The routine then proceeds to step 1406, which sets (=1) an alarm flag ALM, and to step 1407, which activates an alarm (not shown in FIG. 1), thereby warning the driver of the deterioration of the catalytic converter.

If $CS < CS_0$ at step 1405, it can be considered that catalytic converter is not deteriorated, the routine then proceeds to steps 1408 and 1409, which resets (=0) the alarm flag ALM, and deactivates the alarm.

After executing above steps, the alarm flag ALM is stored in the backup RAM 106 at step 1410 for a maintenance purpose, and the counters $CT_1$ and CS are cleared at step 1411. The subroutine is then terminated.

In the above subroutine, the number of reversals of the output signal of one of the upstream $O_2$ sensors (e.g., 13A) may also be used in addition to the number of reversals of the output signal of the downstream $O_2$ sensor 17. In this case, the number of reversals of the output signal (e.g., $V_{1A}$) of the upstream $O_2$ sensor 13A is counted by another counter, e.g., CM, and the catalyst is determined as being deteriorated if the ratio CS/CM is larger than a predetermined value.

② A method for detecting the deterioration of the catalytic converter using the lengths of the output signal response curve of the downstream $O_2$ sensor.

Next, the method for detecting the deterioration of the catalytic converter based on the length of the output signal response curve of the downstream $O_2$ sensor is explained.

FIG. 15A through 15C schematically show the output signal response curves of the upstream $O_2$ sensors ($V_{1A}$, $V_{1B}$) and the downstream $O_2$ sensor ($V_2$) when air-fuel ratio feedback control by the routines in FIGS. 3A, 3B and 5A, 5B are being carried out. FIG. 15A shows the output signal response curves of the upstream $O_2$ sensors ($V_{1A}$, $V_{1B}$) and FIG. 15B, 15C show the output signal response curves of the downstream $O_2$ sensor, when the catalytic converter is not deteriorated (FIG. 15B) and when the catalytic converter has deteriorated (FIG. 15C), respectively.

As shown in FIGS. 15B and 15C, if the air-fuel ratio is feedback controlled, the amplitude of the oscillation of the output signal response curve of the downstream $O_2$ sensor 15 becomes larger and the period of the cycle of the oscillation becomes shorter when the catalyst has deteriorated, which causes the length of the output signal curve of the downstream $O_2$ sensor 17 to become larger (FIG. 18C) when the catalyst has deteriorated, compared to the same when the catalyst is normal (FIG. 15B). Therefore, the deterioration of the catalyst can be detected by monitoring the length of the output signal response curve of the downstream $O_2$ sensor 15.

In this embodiment, the length of the output signal response curve of the downstream $O_2$ sensor is used to determine the state of the catalytic converter together with the length of the output signal response curve of one of the upstream $O_2$ sensors, to compensate for variations in the air-fuel ratio upstream of the catalytic converter due to changes in the operating conditions.

Figure 16A:
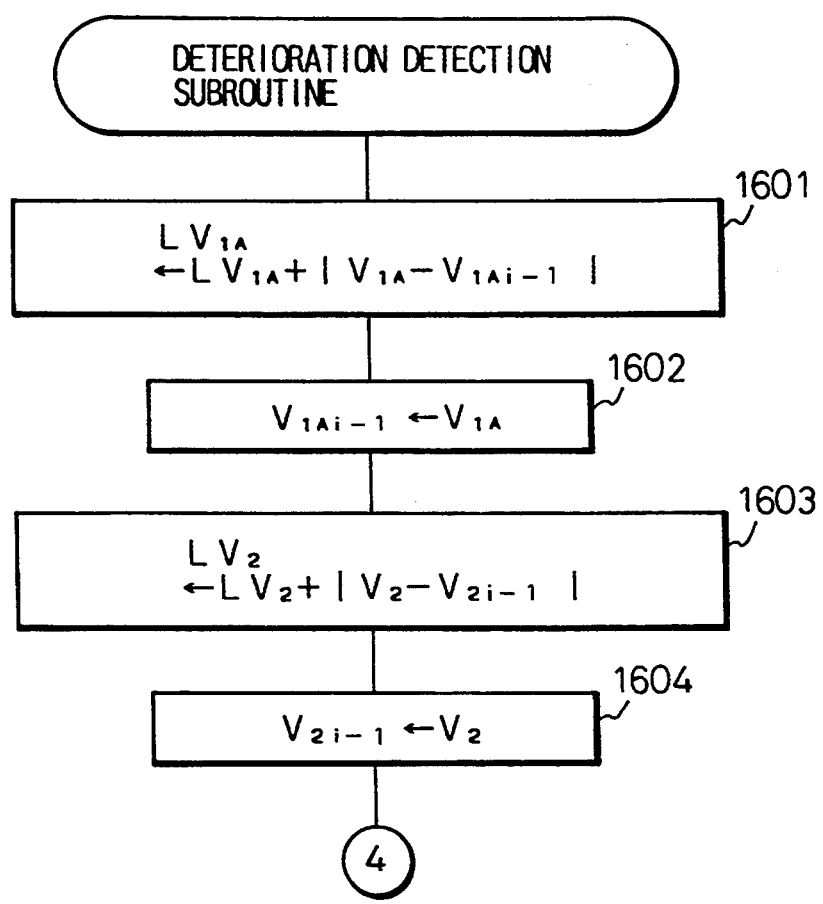
Figure 16B:
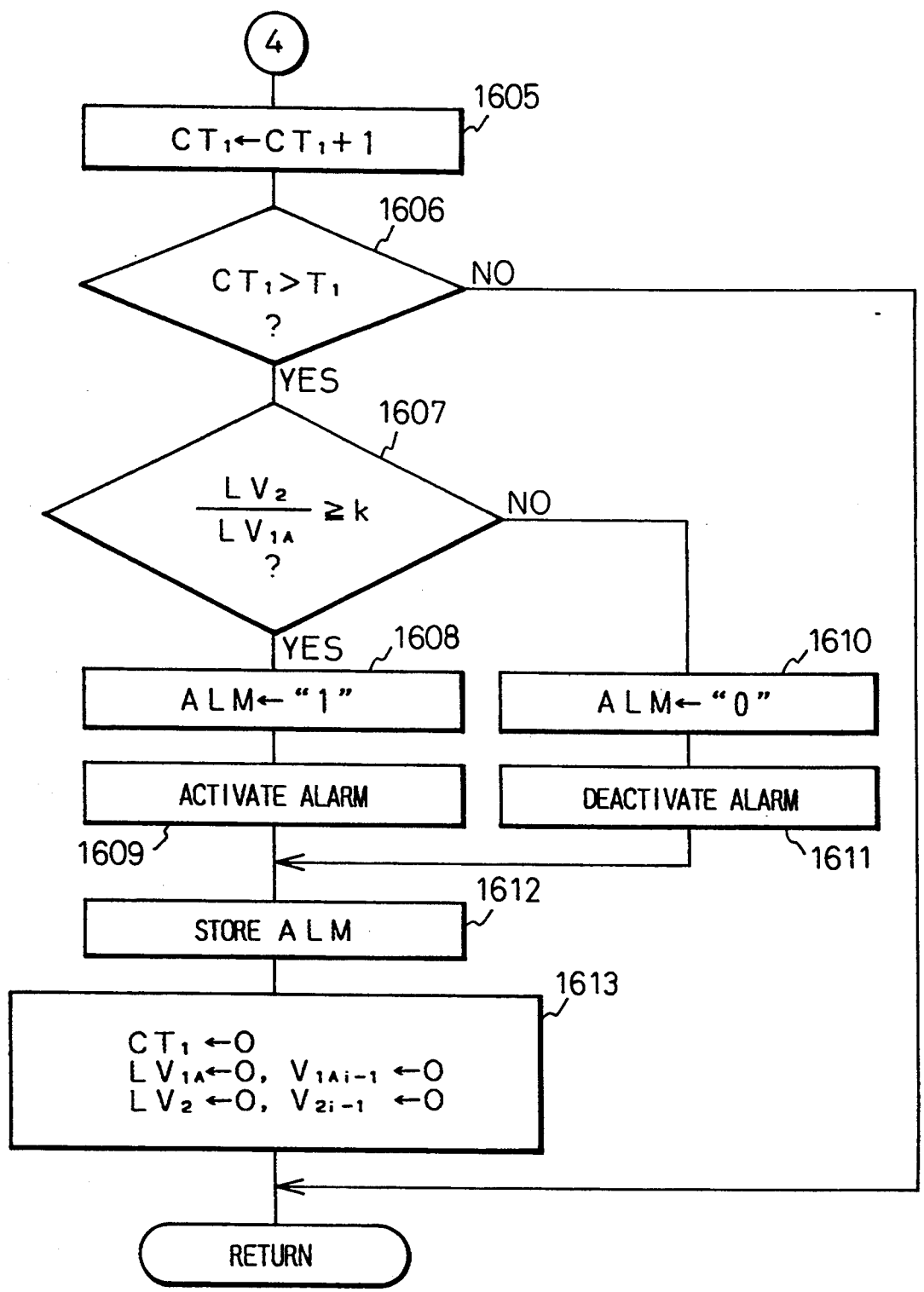

FIGS. 16A and 16B show a flowchart of the subroutine for detecting the catalyst deterioration based on the length of the output signal response curve of the downstream $O_2$ sensor. In this subroutine, the length $LV_2$ of the output signal response curve of the downstream $O_2$ sensor 17, and the length $LV_{1A}$ of the output signal response curve of one of the upstream $O_2$ sensors, e.g., 13A, are calculated, and the catalytic converter is determined as being deteriorated when the ratio $(LV_2/LV_{1A})$ becomes larger than a predetermined value.

Figure 19:
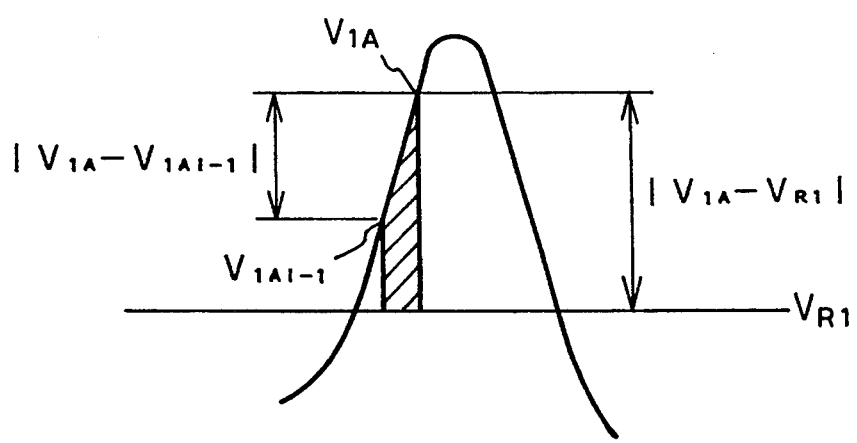
FIG. 19 is a diagram explaining the length and the area of the output signal response curve of the $O_2$ sensor.

In FIG. 16A, when the subroutine starts, at step 1601, the length $LV_{1A}$ of the output signal response curve of the output $V_{1A}$ of the upstream $O_2$ sensor 13A is calculated approximately by $$LV_{1A} \leftarrow LV_{1A} + |V_{1A} - V_{1Ai-1}|$$

where, $V_{1Ai-1}$ is the value of the output $V_{1A}$ when the routine was last executed (see FIG. 19). The routine then proceeds to step 1602 at which the value of $V_{1Ai-1}$ is updated to prepare for the next execution of the routine.

At steps 1603 and 1604, the calculation of the length $LV_2$ of the output signal response curve of the output $V_2$ of the downstream $O_2$ sensor 17 and the updating of the value of $V_{2i-1}$ are carried out.

The routine then proceeds to steps 1605 in FIG. 16B. which counts up the counter $CT_1$ by 1, and 1606, which determines from the value of $CT_1$ whether or not the predetermined time period $T_1$ for executing the detecting operation has lapsed. If the time period $T_1$ has lapsed (i.e., $CT_1 > T_1$ at step 1606), then at step 1607, it is determined whether or not the ratio $LV_2/LV_{1A}$ is larger than a predetermined value K.

If the ratio $LV_2/LV_{1A}$ is larger than or equal to the value K, it is determined that the catalyst has deteriorated, and the routine proceeds to steps 1608, which sets (to 1) the alarm flag ALM, then 1609, which activates the alarm.

If the ratio $LV_2/LV_{1A}$ is smaller than the value K, then the flag ALM is reset (to 0) at step 1610, and the alarm is deactivated at step 1611.

After completing the above steps, the value of the alarm flag ALM is stored in the backup RAM 106 (step 1612), and the parameters used for the detecting operation are cleared (step 1613).

In this embodiment, though both lengths $LV_{1A}$ and $LV_2$ are used for detecting the deterioration of the catalytic converter, it should be understood that the detection of the catalyst deterioration may be carried out using only the length $LV_2$ of the signal response curve of the output $V_2$ of the downstream $O_2$ sensor 15.

Figure 17A:
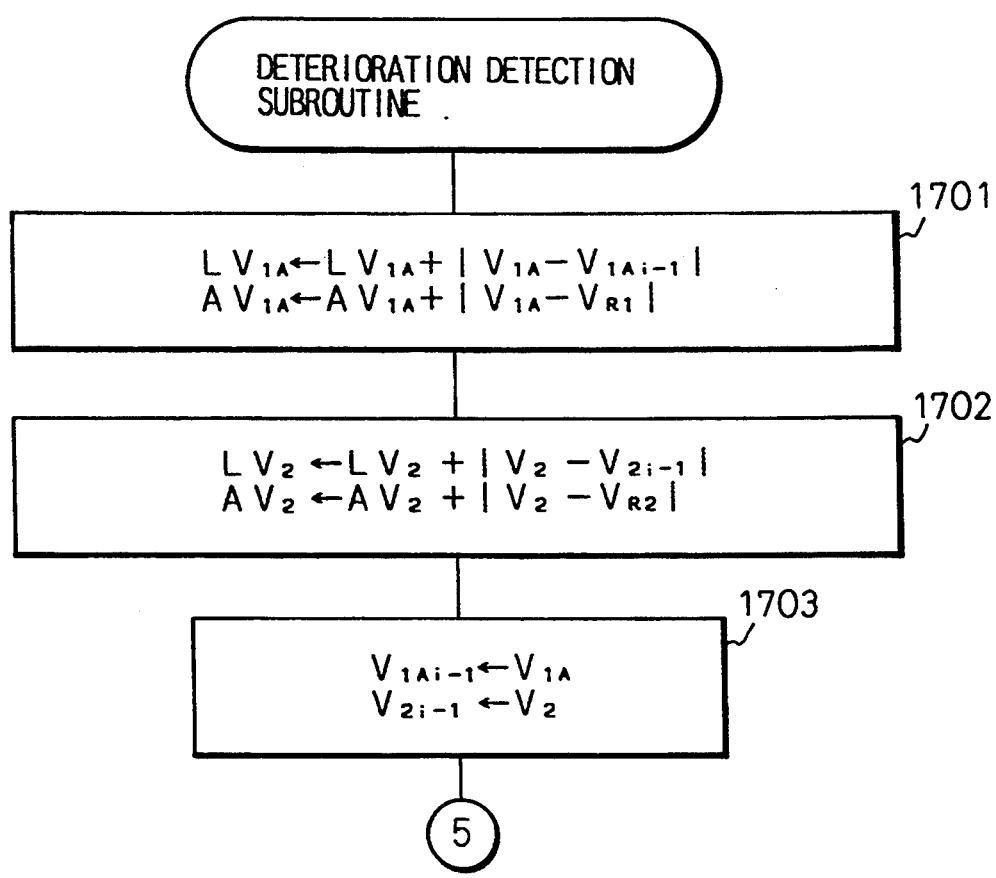

③ A method for detecting the deterioration of the catalytic converter using the lengths and areas of the output signal response curves of the upstream $O_2$ sensor and the downstream $O_2$ sensor FIGS. 17A and 17B show an embodiment of the subroutine for detecting the deterioration of the catalyst based on the lengths and areas of the output signal response curves of the downstream $O_2$ sensor 17 and one of the upstream $O_2$ sensors (e.g., 13A).

In this embodiment, the areas $(AV_2$ and $AV_{1A}$; hatched area in FIGS. 15A through 15C) bounded by the output signal response curves $(V_2$ and $V_{1A})$ of the downstream and the upstream $O_2$ sensors and the reference voltage line $(V_{R2}$ and $V_{R1})$ thereof are used, as well as the lengths $LV_2$ and $LV_{1A}$ of the output signal response curves, to increase the accuracy of the detection.

As illustrated in FIG. 15B, when the catalyst is not deteriorated, the area $AV_2$ bounded by the output signal response curve of the downstream $O_2$ sensor and the reference voltage line $V_{R2}$ is relatively large although the length $LV_2$ of the output signal response curve is relatively small. On the other hand, when the catalyst has deteriorated, the area $AV_2$ becomes relatively small although the length $LV_2$ becomes relatively large, as illustrated in FIG. 15C. Therefore, the deterioration of the catalyst can be detected more accurately by monitoring the area $AV_2$ as well as the length $LV_2$ of the downstream $O_2$ sensor. Such a method for detecting the catalyst deterioration based on the lengths and the areas of the $O_2$ sensors is disclosed in the copending U.S. application Ser. No. 957,041 in detail and the disclosure thereof is incorporated into the present specification by reference thereto.

Figure 18A:
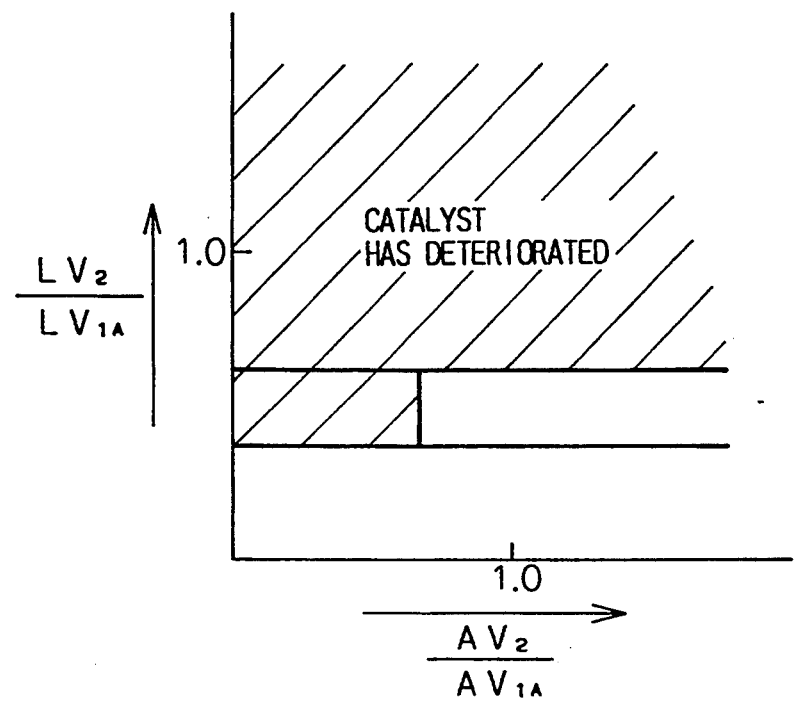
Figure 18B:
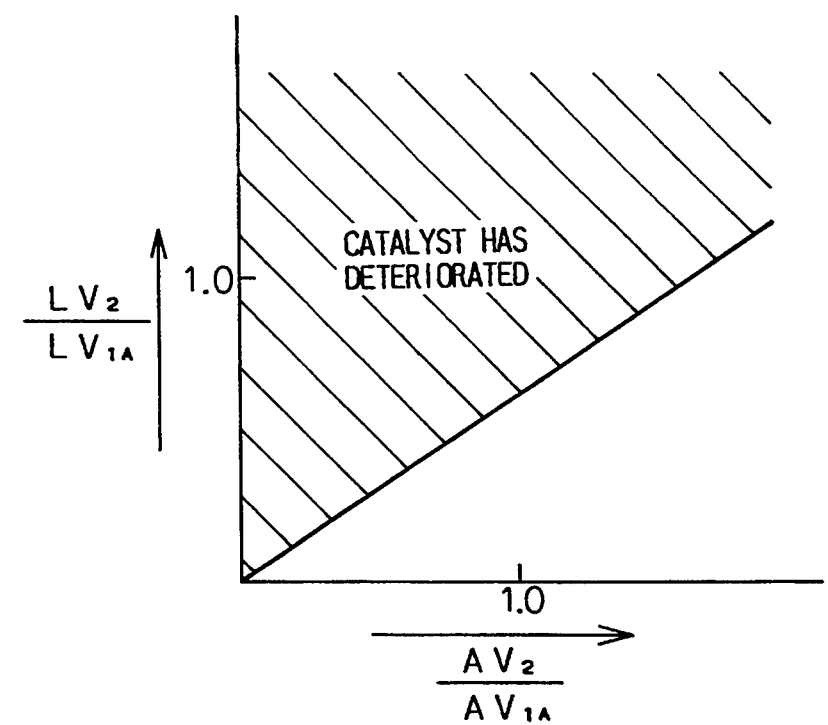

In this embodiment, the lengths $LV_2$, $LV_{1A}$ and the areas $AV_2$, $AV_{1A}$ of the output signal response curves $V_2$, and $V_{1A}$ of the downstream and the upstream $O_2$ sensor, 17 and 13A, respectively, are calculated, and the catalyst deterioration is detected based on the ratios $(LV_2/LV_{1A})$ and $(AV_2/AV_{1A})$ using either one of the maps illustrated in FIGS. 18A through 18C.

In FIG. 17A, when the subroutine starts, the length $LV_{1A}$ and the area $AV_{1A}$ of the output signal response curve $V_{1A}$ of the upstream $O_2$ sensor are calculated at step 1701, and the length $LV_2$ and the area $AV_2$ of the output signal response curve of the downstream $O_2$ sensor are calculated at step 1702. The lengths $LV_{1A}$ and $LV_2$ are calculated by the same formula as in steps 1601 and 1603 in FIG. 16A. The areas $AV_{1A}$ and $AV_2$ are calculated approximately by, $$AV_{1A} \leftarrow AV_{1A} + |V_{1A} - V_{R1}|$$

$$AV_2 \leftarrow AV_2 + |V_2 - V_{R2}|$$

where, $V_{R1}$ and $V_{R2}$ are the reference voltages of the upstream $O_2$ sensor and the downstream $O_2$ sensor, respectively. Then, after the values of $V_{1Ai-1}$ and $V_{2i-1}$ are updated at step 1703, the routine proceeds to step 1704 in FIG. 17B.

At step 1704, the counter $CT_1$ is counted up by 1, and at step 1705, it is determined from the value of CT, whether or not the predetermined time period $T_1$ for the execution of the determining operation has lapsed. If the time period $T_1$ has lapsed (i.e., $CT_1 > T_1$ at step 1705), a ratio of the length $(LV_2/LV_{1A})$ and a ratio of the areas $(AV_2/AV_{1A})$ are calculated at step 1706, and the deterioration of the catalyst is determined by either one of the maps in FIGS. 18A through 18C.

After determining the catalyst deterioration at step 1707, the alarm flag ALM is set or reset, and the alarm is activated or deactivated at steps 1708 to 1711 in accordance with the result of the above determination. The value of the alarm flag ALM is then stored in the backup RAM 106 (step 1712), and the parameters are cleared (step 1713).

In the embodiments in FIGS. 16A through 19, the output signal response curve of the upstream $O_2$ sensor 13A is used for detecting operation of the deterioration of the catalytic converter, however, it will be understood that the output signal response curve of the upstream O₂ sensor 13B can equally be used instead of upstream O₂ sensor 13A, for detecting the catalyst deterioration.

Another embodiment of the operation for detecting the spontaneous synchronization of the phases of the air-fuel ratio oscillations will now be explained.

In the embodiments explained above, it is assumed that the phases of the air-fuel ratio oscillations of the exhaust gases flowing into the common exhaust passage from the respective individual exhaust passages are synchronized at the junction point 150 (FIG. 1) when the phases of the air-fuel ratio oscillations of the respective cylinder banks are synchronized. This assumption is valid if the respective individual exhaust passages have same length. However, in some cases, the lengths of the respective individual exhaust passages are substantially different. In such a case, even if the air-fuel ratio oscillations of the respective cylinder banks are synchronized, the phases of the air-fuel oscillations of the exhaust gases of the respective individual exhaust passages are not necessarily synchronized because the time required for the exhaust gases to travel from the respective cylinder banks to the junction point is different in the respective individual exhaust passage.

Therefore, when the lengths of the respective individual exhaust passages are substantially different, it is preferable to consider the difference in the time for the exhaust gas travelling along the length of the individual exhaust passages.

In the following embodiment, the control circuit 10 detects the difference of the phases of the air-fuel oscillations of the respective cylinder banks from the difference in the timing of the rich skips (or the lean skips) in the respective cylinder banks. Also, the control circuit calculates the difference in the times for exhaust gas to travel along the length of the individual exhaust passages based on the length of the respective individual exhaust passages and the operating condition of the engine (i.e., the velocity of the exhaust gas in the individual exhaust passage), and determines that whether or not the spontaneous synchronization of the phase of the air-fuel ratio oscillations is occurring at the junction point.

More particularly, if the rich skip occurs in the cylinder bank A at TIMEA, the exhaust gas discharged from the cylinder bank A reaches the junction point at the time [TIMEA+$T_{EXA}$]. Where, $T_{EXA}$ is a time required for the exhaust gas to travel along the length of the individual exhaust passage of the cylinder bank A, and determined in accordance with the length of the exhaust passage of the cylinder bank A and the engine operating condition (i.e., the velocity of the exhaust gas in the exhaust passage).

Similarly, if the rich skip occurs in the cylinder bank B at TIMEB, the exhaust gas discharged from the cylinder bank B reaches the junction point at the time [TIMEB+$T_{EXB}$]. Where, $T_{EXB}$ is a time required for the exhaust gas to travel along the length of the individual exhaust passage of the cylinder bank B, and determined in accordance with the length of the exhaust passage of the cylinder bank B and the engine operating condition.

Therefore, when the difference between the times [TIMEA+$T_{EXA}$] and [TIMEB+$T_{EXB}$] is small enough (e.g., not larger than about 150 ms), it can be considered that the exhaust gas discharged from cylinder banks A and B when the rich skip occurs in the respective cylinder banks reach the junction point simultaneously (i.e., the phases of the air-fuel ratio oscillation in the exhaust gases flowing into the common exhaust passage from the respective individual exhaust passages are synchronized).

In this embodiment, the control circuit determines that the synchronization in the phases of the air-fuel ratio oscillation of the exhaust gases is occurring at the junction point when either of the time difference TIMEINTA and TIMEINTB calculated by the routine in FIG. 12 becomes smaller than or equal to the value ($C_2+\Delta T_{EX}$) and ($C_2-\Delta T_{EX}$). Where, $\Delta T_{EX}$ represents the difference between $T_{EXA}$ and $T_{EXB}$ (i.e., $\Delta T_{EX}=T_{EXA}-T_{EXB}$; in this embodiment, it is assumed that $T_{EXA}>T_{EXB}$), and $C_2$ is set at approximately 150 ms).

As explained above, it can be considered that the synchronization is occurring at the junction point when the difference [TIMEA+$T_{EXA}$]−[TIMEB+$T_{EXB}$] (or, [TIMEB+$T_{EXB}$]−[TIMEA+$T_{EXA}$]) becomes smaller than or equal to a predetermined value $C_2$ (=150 ms), i.e., $$0 < [TIMEA+T_{EXA}]-[TIMEB+T_{EXB}] \leq C_2$$

or, $$0 < [TIMEB+T_{EXB}]-[TIMEA+T_{EXA}] \leq C_2$$

This can be expressed as;

$$0 < [TIMEA-TIMEB]+(T_{EXA}-T_{EXB}) \leq C_2$$

or, $$2 < [TIMEB-TIMEA]-(T_{EXA}-T_{EXB}) \leq C_2$$

Since TIMEA−TIMEB=TIMEINTA, TIMEB−TIMEA=TIMEINTB, and $T_{EXA}-T_{EXB}=\Delta T_{EX}$, the above formula can be modified as;

$$TIMEINTA \leq C_2-\Delta T_{EX}$$

or, $$\Delta T_{EX} < TIMEINTB \leq C_2+\Delta T_{EX}$$

Therefore, the synchronization can be determined based on TIMEINTA, TIMEINTB, and $\Delta T_{EX}$.

Figure 20:
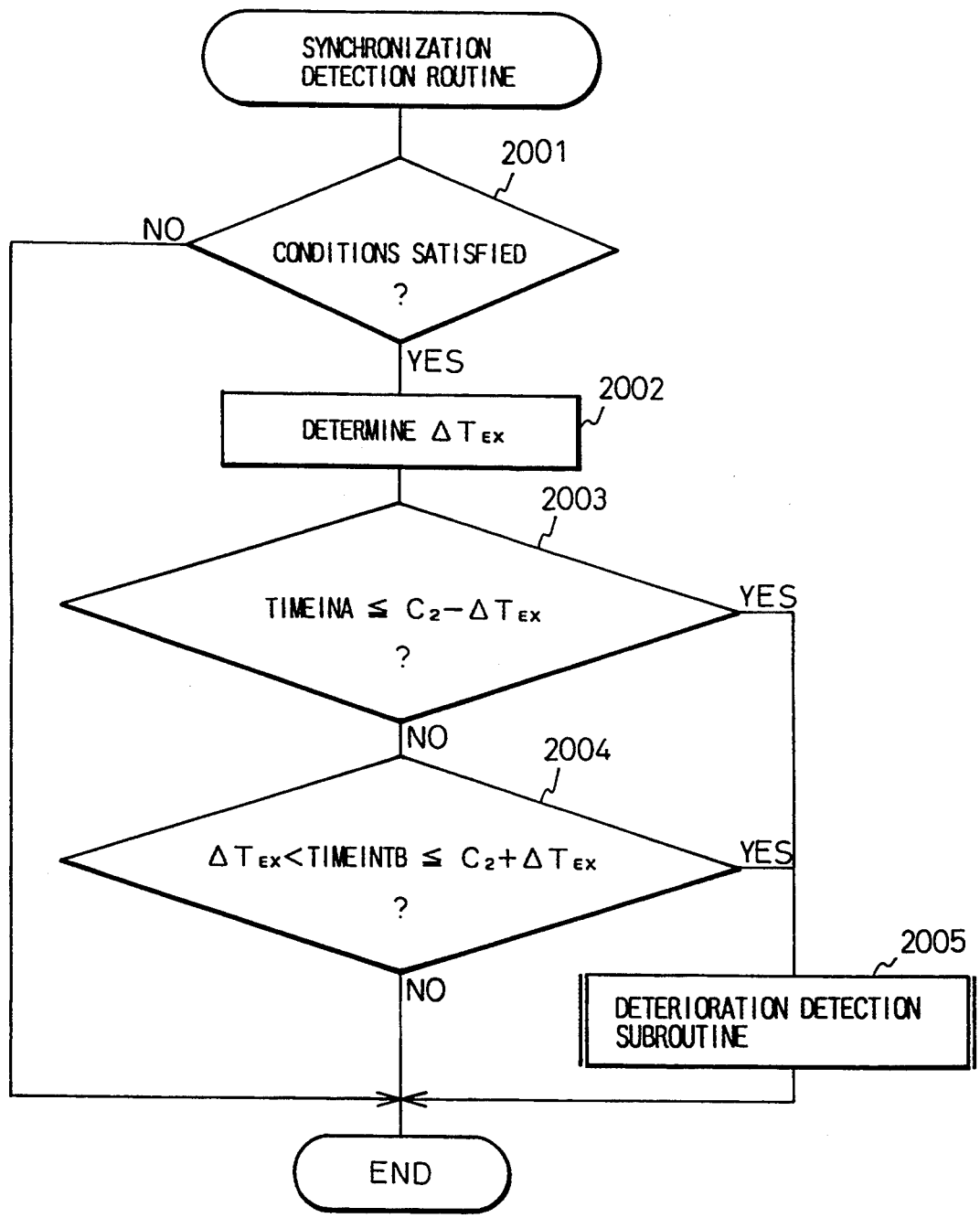
FIG. 20 is a flowchart showing another embodiment of the operation for detecting the synchronization of the phases of air-fuel ratio oscillations of exhaust gases according to the present invention.

FIG. 20 is a flowchart showing the operation for determining the synchronization based on the procedure explained above. This routine is executed by the control circuit in lieu of the routine of FIG. 13. Also, in this embodiment, the routine of FIG. 12 is executed to calculate TIMEINTA and TIMEINTB as a part of the air-fuel ratio feedback control routine (i.e., instead of the routine of FIG. 3B).

Figure 21:
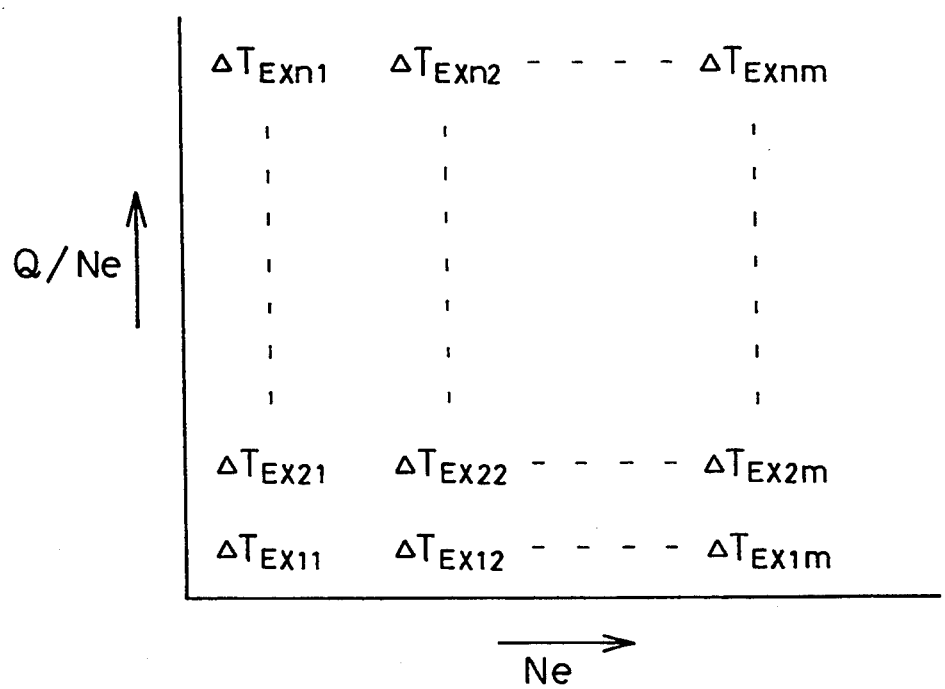
FIG. 21 shows a schematic example of the numerical table used for determining $\Delta T_{EX}$ in FIG. 20; and, FIG. 22 shows an embodiment of the present invention, when applied to different type of engine.

In FIG. 20, when the routine starts, at step 2001, it is determined whether or not the conditions for performing the detection of the catalytic converter deterioration are satisfied. The conditions are the same as those of step 901 in FIG. 9, step 1101 in FIG. 11, and step 1301 in FIG. 13. If the conditions are satisfied at step 2001, the routine then proceeds to step 2002 which determines the value of $\Delta T_{EX}$. In this embodiment, the values of $\Delta T_{EX}$ are determined previously, for example, by experiment, and stored in the ROM 104 of the control circuit 10 in the form of a numerical table using the engine speed $N_e$ and the load of the engine represented by the amount of the inlet air flow per revolution of the engine ($Q/N_e$). FIG. 21 schematically shows the example of the numerical table used in step 2002.

At steps 2003 and 2004, it is determined whether or not the synchronization of the air-fuel ratio oscillations of of the exhaust gases is occurring at the junction point as explained above. If either of the conditions of steps 2003 and 2004 is satisfied, the subroutine for detecting the deterioration of the catalytic converter is executed at step 2005. The subroutine executed at step 2005 is same as those in FIGS. 14 to 17B.

In the above embodiment, the value of $\Delta T_{EX}$ is determined at step 2002 in accordance with the operating condition of the engine. However, according to the sizes and the lengths of the individual exhaust passages, there are cases in which the value of $\Delta T_{EX}$ changes only slightly within the whole operating range of the engine. In such a case, a constant value can be used for $\Delta T_{EX}$ regardless of the operating condition of the engine.

Further, although the difference in the timing of the rich skip (or the lean skip) is used for determining the synchronization in the above embodiment, other parameters can be used, for example, the difference of the timing of the reversal of the output of the upstream $O_2$ sensors can be used instead of the difference of the timing of the rich skip.

From the explanation set force above, it will be understood that according to the present invention, the deterioration of the catalytic converter can be detected without forcibly synchronizing the phases of the air-fuel ratio of the respective cylinder banks, thus the deterioration of the control characteristics and the exhaust emission can be prevented.

Figure 22:
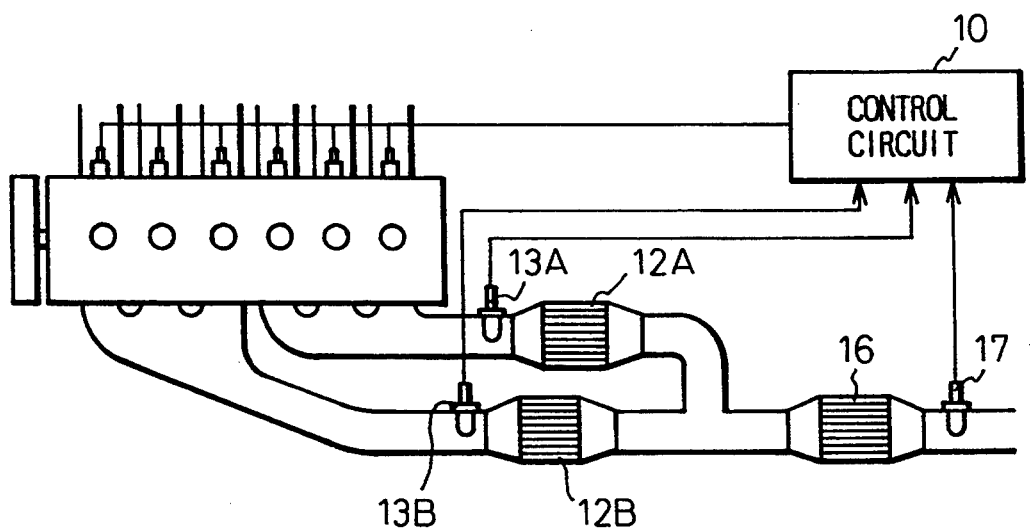

Although the above embodiments describe the case in which the present invention is applied to a V-type engine having two cylinder groups, the present invention also can be applied to in-line engines having a plurality of cylinder groups as shown in FIG. 22, or engines having more than two cylinder groups.

Also, though the above embodiment describes the triple $O_2$ sensor system in which both the starting catalytic converters (which are disposed in the respective individual exhaust passages) and the main catalytic converter (which is disposed in the common exhaust passage) are used, this invention can be also applied to the triple $O_2$ sensor system having only catalytic converters disposed in the respective individual exhaust passages. In this case, if one or more of the catalytic converters has deteriorated, the deterioration can be detected by the procedure explained above. Similarly, it will be understood that the present invention can be also applied to the triple $O_2$ sensor system having only one catalytic converter disposed in the common exhaust passage.

Further, in the embodiment in FIGS. 8 through 13, the determination of the synchronization of the phases of the air-fuel ratio of the respective cylinder groups are carried out during normal air-fuel ratio feedback control. However, in some operating condition of the engine, for example, when the air-fuel ratio feedback control is re-started after a fuel-cut during a deceleration is terminated or after a power fuel increment is terminated, the phases of the respective cylinder groups are always synchronized spontaneously. Therefore, the detection of the deterioration of the catalytic converter can be performed when such an operating condition is detected.

Further, although both of the upstream $O_2$ sensor and the downstream $O_2$ sensor are used for the air-fuel ratio feedback control in the above embodiments, the air-fuel ratio feedback control may be carried out only using the upstream $O_2$ sensors. In this case, the downstream $O_2$ sensor is only used for detecting the deterioration of the catalytic converter.

Also, the present invention can be applied to other types of air-fuel ratio feedback control operations by a double $O_2$ sensor system, in which, for example, the delay period TDR, TDL, or the integration amount KIR, KIL are variable, or a second air-fuel ratio correction factor FAF2 is introduced. Further, although $O_2$ sensors are used for air-fuel ratio sensors in the above embodiments, other types of sensors, such as CO sensors or lean mixture sensors also can be used as the air-fuel ratio sensor in the present invention.

Therefore, although the present invention has been described with reference to specific embodiments chosen for the purpose of illustration, it should be understood that numerous modifications could be applicable by those skilled in the art without departing from the basic concept and scope of the present invention.

I claim:

1. A device for detecting a deterioration of a three-way catalytic converter for an internal combustion engine, said engine comprising, a plurality of cylinders divided into cylinder groups, individual exhaust passages connected to the respective cylinder groups, a common exhaust passage into which said individual exhaust passages are merged, a three-way catalytic converter disposed in said common exhaust passage, or in each of said individual exhaust passages, or both, a downstream air-fuel ratio sensor disposed in said common exhaust passage to detect an air-fuel ratio of the exhaust gas downstream of said catalytic converter(s), and an air-fuel ratio control means for individually controlling the air-fuel ratio of each cylinder group so that the air-fuel ratio of each cylinder group oscillates periodically between a rich air-fuel ratio and a lean air-fuel ratio, said device comprising:

a synchronization detecting means for determining whether or not conditions in which phases of air-fuel ratio oscillations of exhaust gases flowing into said common exhaust passage from said respective individual exhaust passages spontaneously synchronize, are satisfied; and, a determining means for determining whether or not said three-way catalytic converter(s) has deteriorated, based on, at least, the output signal of said downstream air-fuel ratio sensor when said synchronization detecting means determines that said conditions for said spontaneous synchronization of the phases of the air-fuel ratio oscillations of the exhaust gases are satisfied.

2. The device according to claim 1, wherein said synchronization detecting means comprises a phase detecting means for detecting phases of the air-fuel ratio oscillations of the respective cylinder groups and, said synchronization detecting means determines that said conditions for said spontaneous synchronization of the phases of the air-fuel ratio oscillations of the exhaust gases are satisfied when the phases of the air-fuel ratio oscillations of the respective cylinder groups synchronize.

3. The device according to claim 2, wherein said air-fuel ratio control means comprises upstream air-fuel ratio sensors disposed in said respective individual exhaust passages for detecting air-fuel ratios of the exhaust gases in said individual exhaust passages upstream of said catalytic converter(s), a means for determining control parameters for controlling the air-fuel ratios of the respective cylinder groups at least in accordance with the output signals of said upstream air-fuel ratio sensors, and a means for controlling the air-fuel ratios of the air-fuel mixtures supplied to the respective cylinder groups based on said control parameters; and, said phase detecting means detects the phases of the air-fuel ratio oscillations of the respective cylinder groups based on said control parameters.

4. The device according to claim 2, wherein said air-fuel ratio control means comprises upstream air-fuel ratio sensors disposed in said respective individual exhaust passages for detecting air-fuel ratios of the exhaust gases in said individual exhaust passages upstream of said catalytic converter(s), a means for determining control parameters for controlling the air-fuel ratios of the respective cylinder groups at least in accordance with the output signals of said upstream air-fuel ratio sensors, and a means for controlling the air-fuel ratios of the air-fuel mixtures supplied to the respective cylinder groups based on said control parameters; and, said phase detecting means detects the phases of the air-fuel ratio oscillations of the respective cylinder groups based on the output signals of said upstream air-fuel ratio sensors.

5. The device according to claim 1, wherein said synchronization detecting means comprises a phase detecting means for detecting phases of the air-fuel ratio oscillations of the respective cylinder groups and, said synchronization detecting means determines that said conditions for said spontaneous synchronization of the phases of the air-fuel ratio oscillations of the exhaust gases are satisfied when the differences in the phases of the air-fuel ratio oscillations of the respective cylinder groups become predetermined time periods.

6. The device according to claim 5, wherein said predetermined time periods are constant regardless of the operating condition of the engine.

7. The device according to claim 6, wherein said air-fuel ratio control means comprises upstream air-fuel ratio sensors disposed in said respective individual exhaust passages for detecting air-fuel ratios of the exhaust gases in said individual exhaust passages upstream of said catalytic converter(s), a means for determining control parameters for controlling the air-fuel ratios of the respective cylinder groups at least in accordance with the output signals of said upstream air-fuel ratio sensors, and a means for controlling the air-fuel ratios of the air-fuel mixtures supplied to the respective cylinder groups based on said control parameters; and, said phase detecting means detects the phases of the air-fuel ratio oscillations of the respective cylinder groups based on said control parameters.

8. The device according to claim 6, wherein said air-fuel ratio control means comprises upstream air-fuel ratio sensors disposed in said respective individual exhaust passages for detecting air-fuel ratios of the exhaust gases in said individual exhaust passages upstream of said catalytic converter(s), a means for determining control parameters for controlling the air-fuel ratios of the respective cylinder groups at least in accordance with the output signals of said upstream air-fuel ratio sensors, and a means for controlling the air-fuel ratios of the air-fuel mixtures supplied to the respective cylinder groups based on said control parameters; and, said phase detecting means detects the phases of the air-fuel ratio oscillations of the respective cylinder groups based on the output signals of said upstream air-fuel ratio sensors.

9. The device according to claim 5, wherein said predetermined time periods are determined in accordance with the operating condition of the engine.

10. The device according to claim 9, wherein said air-fuel ratio control means comprises upstream air-fuel ratio sensors disposed in said respective individual exhaust passages for detecting air-fuel ratios of the exhaust gases in said individual exhaust passages upstream of said catalytic converter(s), a means for determining control parameters for controlling the air-fuel ratios of the respective cylinder groups at least in accordance with the output signals of said upstream air-fuel ratio sensors, and a means for controlling the air-fuel ratios of the air-fuel mixtures supplied to the respective cylinder groups based on said control parameters; and, said phase detecting means detects the phases of the air-fuel ratio oscillations of the respective cylinder groups based on said control parameters.

11. The device according to claim 9, wherein said air-fuel ratio control means comprises upstream air-fuel ratio sensors disposed in said respective individual exhaust passages for detecting air-fuel ratios of the exhaust gases in said individual exhaust passages upstream of said catalytic converter(s), a means for determining control parameters for controlling the air-fuel ratios of the respective cylinder groups at least in accordance with the output signals of said upstream air-fuel ratio sensors, and a means for controlling the air-fuel ratios of the air-fuel mixtures supplied to the respective cylinder groups based on said control parameters; and, said phase detecting means detects the phases of the air-fuel ratio oscillations of the respective cylinder groups based on the output signals of said upstream air-fuel ratio sensors.

* * * * *